(12) United States Patent
Kuroki

(10) Patent No.: US 8,514,207 B2
(45) Date of Patent: Aug. 20, 2013

(54) DISPLAY APPARATUS AND METHOD

(75) Inventor: Yoshihiko Kuroki, Kanagawa (JP)

(73) Assignee: Sony Corporation, Tokyo (JP)

( * ) Notice: Subject to any disclaimer, the term of this patent is extended or adjusted under 35 U.S.C. 154(b) by 649 days.

(21) Appl. No.: 12/461,840

(22) Filed: Aug. 26, 2009

(65) Prior Publication Data

US 2009/0315875 A1    Dec. 24, 2009

Related U.S. Application Data

(63) Continuation of application No. 10/572,793, filed as application No. PCT/JP2005/010581 on Jun. 9, 2005.

(30) Foreign Application Priority Data

Aug. 10, 2004 (JP) ................. 2004-233280
Aug. 25, 2004 (JP) ................. 2004-244641

(51) Int. Cl.
     *G09G 5/00*      (2006.01)
(52) U.S. Cl.
     USPC ............. 345/204; 345/76; 345/82; 345/100; 345/213; 345/690; 315/169.1; 315/169.2; 315/169.3; 315/169.4; 349/5
(58) Field of Classification Search
     USPC ..... 345/76, 82, 89, 98–100, 87, 94, 211–213, 345/102, 58, 690–692; 315/169.1–169.4; 349/5
See application file for complete search history.

(56) References Cited

U.S. PATENT DOCUMENTS

| | | | |
|---|---|---|---|
| 2002/0003522 A1 | 1/2002 | Baba et al. | |
| 2002/0015104 A1 | 2/2002 | Itoh et al. | |
| 2002/0021364 A1* | 2/2002 | Asada et al. | 348/312 |
| 2003/0179221 A1* | 9/2003 | Nitta et al. | 345/690 |
| 2004/0081437 A1* | 4/2004 | Asada et al. | 386/131 |

FOREIGN PATENT DOCUMENTS

| | | |
|---|---|---|
| EP | 0 603 688 | 6/1994 |
| EP | 1 280 129 A2 | 1/2003 |
| GB | 2 378 343 A | 2/2003 |
| JP | 61-142888 A | 6/1986 |
| JP | 04-097146 A | 3/1992 |
| JP | 04-302289 | 10/1992 |
| JP | 06-022256 | 1/1994 |

(Continued)

OTHER PUBLICATIONS

Japanese Office Action issued Aug. 11, 2009 for corresponding Japanese Application No. 2004-244641.

(Continued)

*Primary Examiner* — Lun-Yi Lao
*Assistant Examiner* — Insa Sadio
(74) *Attorney, Agent, or Firm* — Rader, Fishman & Grauer PLLC

(57) ABSTRACT

Image processing and corresponding apparatus, methods and systems. The image processing includes controlling n number of data-line driver circuits included in a display apparatus, the data-line driver circuit driving n number of subpixels. Such controlling causes to display a moving picture image such that frame information of the moving picture image with first frame rate is displayed at a second frame rate, which is 1/n of the first frame rate, and the n number of subpixels included in each pixel are sequentially driven with a time shift, the time shift being 1/n of display period of single frame with the second frame rate.

14 Claims, 21 Drawing Sheets

(56) References Cited

FOREIGN PATENT DOCUMENTS

| JP | 07-199149 A | 8/1995 |
|---|---|---|
| JP | 09-159999 | 6/1997 |
| JP | 10-12424 | 5/1998 |
| JP | 10-254390 A | 9/1998 |
| JP | 2001-042831 | 2/2001 |
| JP | 2002-041002 | 2/2002 |
| JP | 2003-029238 | 1/2003 |
| JP | 2004-177575 | 6/2004 |
| JP | 2004266808 A * | 9/2004 |
| WO | WO-00/33288 A1 | 6/2000 |
| WO | WO-00/55687 A1 | 9/2000 |

OTHER PUBLICATIONS

European Search Report issue Mar. 24, 2010 for corresponding European Application No. 09 01 5796.
European Search Report issued Mar. 24, 2010 for corresponding European Application No. 09 01 4270.
European Communication Pursuant to Article 94(2)EPC issued Apr. 9, 2010 for corresponding European Application No. 09 014 270.4.
Japanese Office Action issued May 26, 2011 for related Japanese Application No. 2008-144524.
Gerald Westheimer, Ph.D., "Eye Movement Responses to a Horizontally Moving Visual Stimulus", A.M.A. Archives of Ophthalmology, 52, pp. 932-941, 1954.
Craig H. Meyer, et al., "The Upper Limit of Human Smooth Pursuit Velocity", Vision Res. vol. 25, No. 4, pp. 561-563, 1985.
Yasushi Tadokoro, "Hishatai sokudo to shikaku no kankei", NHK Technical Report, pp. 422-426, Sep. 1968.
Japanese Office Action dated Jan. 21, 2008 for corresponding Japanese Application No. 2004-244641.
Japanese Office Action dated Apr. 2, 2008 for corresponding Japanese Application No. 2004-244641.
Supplementary European Search Report issued Apr. 29, 2009 for corresponding European Application No. 05 74 8868.
International Search Report mailed Jul. 12, 2005.
International Written Opinion mailed Jul. 12, 2005.

* cited by examiner

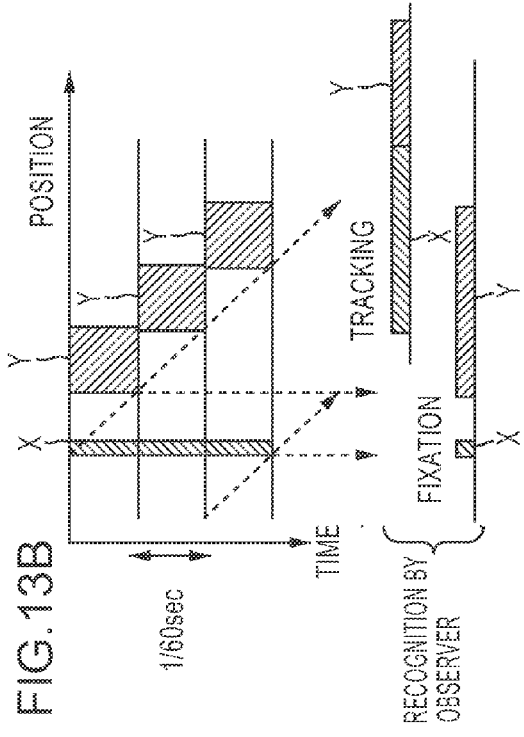
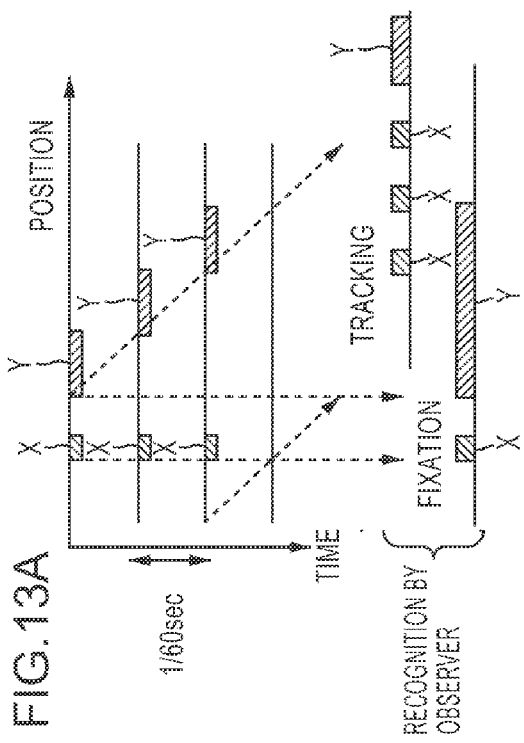
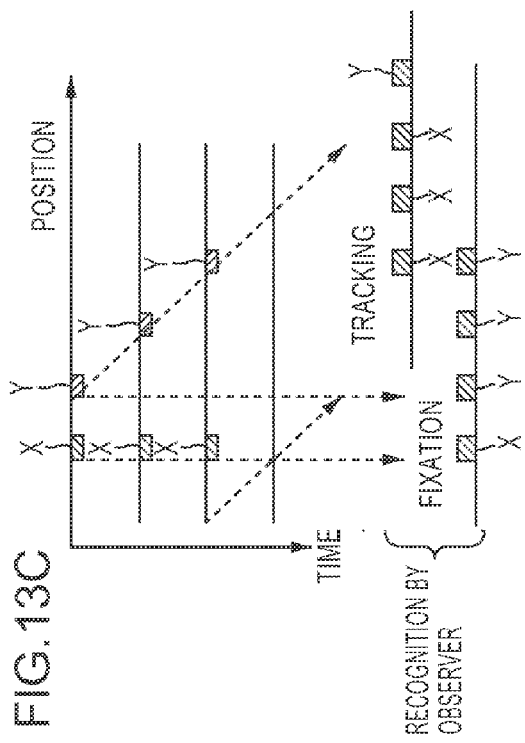

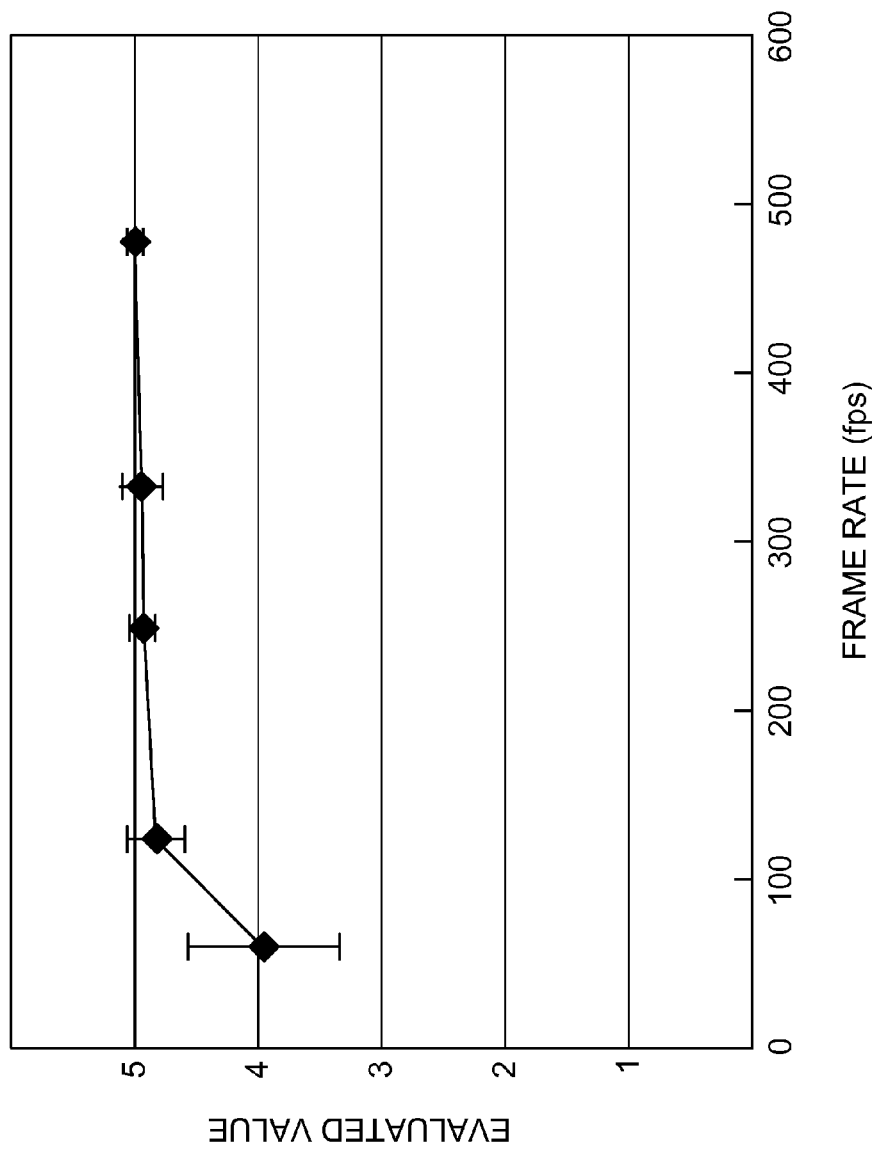

DISPLAY APPARATUS AND METHOD

CROSS REFERENCE TO RELATED APPLICATIONS

This is a Continuation Application of U.S. patent application Ser. No. 10/572,793, filed Mar. 21, 2006, which is based on a National Stage Application of PCT/JP05/010581, filed Jun. 9, 2005, which in turn claims priority from Japanese Application No.: 2004-233280, filed on Aug. 10, 2004 and Japanese Application No.: 2004-244641, filed on Aug. 25, 2004, the entire contents of which are incorporated herein by reference.

BACKGROUND OF THE INVENTION

1. Technical Field

The present invention relates to a display apparatus and method, and more particularly to a display apparatus and method suitable for display of moving images.

2. Background Art

There is a demand for improving the quality of displayed images, as by improving signal processing techniques and driving techniques for image display devices.

In general, the image quality of an image can be improved by increasing the resolution of the image and smoothing the texture thereof. The amount of information of an image is expressed in the unit of pixels indicative of dots (dots) which constitute the image. The number of pixels of an image is expressed by the number of horizontal and vertical dots of the image, such as 800×600 or 1024×768. More specifically, the greater the number of pixels (dots), the more smooth the texture of the image and the more the amount of information constituting the image.

To display an image with high resolution, there is a technique (refer to Patent Document 1, for example) which makes it possible to display an image with twice as high resolution in a multi mode compared to a system using only one display, by using, for example, two displays 1 and 2 so as to cause the display 1 to display an image in a normal single mode and so as to cause the respective displays 1 and 2 to display the left and right halves of the image in the multi mode.

[Patent Document 1] Japanese Patent Application Publication No. Hei-10-124024

If an image is displayed with increased resolution, the amount of information constituting the image increases, so that the amount of data to be transferred to the display 1 or 2 increases and the data transfer rate needs to be increased. For this reason, this system is constructed to perform transfer of image data without increasing the data transfer rate, by reducing the amount of data for each dot of the displays 1 and 2 and performing conversion of the reduced data through signal processing.

In addition, the image quality of a moving image in particular can be improved by increasing α frame rate which is the number of times per second of updating of a screen.

For example, when a moving image is to be projected and displayed on a screen by using a projector, the projector displays α frame image line by line by performing horizontal scan on a line by line basis, and after having scanned all lines of one frame of image, starts scanning image data of the succeeding frame, thereby displaying the moving image.

As mentioned above, the image quality of a moving image in particular can be improved by increasing the frame rate. However, in order to perform display processing according to high frame rates, it is necessary to increase the processing speed of a driving circuit for driving a display device, and furthermore, it is necessary to increase the reaction speed of a light-amount modulation element which determines the intensity of an image. This method is technically difficult, and results in an increase in cost.

Although it is known that the image quality of a moving image can be improved by increasing the frame rate, it is impossible to actually examine the relationship between the frame rate and the image quality of the moving image at increased frame rates. Accordingly, it has not yet been clear whether it is possible to improve the image quality of a moving image to an unlimited extent by increasing the frame rate to an unlimited extent.

As a matter of course, it has been impossible to quantitatively understand the relationship between the frame rate and the moving image at increased frame rate.

For this reason, the present inventor noticed the frame rate of the next generation digital cinema format, and examined its necessary limitations in terms of visual characteristics.

It has heretofore been considered that the speed of a pursuit eye movement which is called smooth pursuit coincides with the moving speed of a visual target. Westheimer has stated that the eyes move at the same speed as the speed of a visual target which is not higher than 30 deg/sec (Westheimer, G., A. M. A. Arch. Ophthal. 52, pp. 932-941, 1954).

However, later researches have demonstrated that the speeds of pursuit eye movements are in almost all cases smaller than the speeds of visual targets. Meyer, et al. have stated that the pursuit speed of the eyes is approximately 0.87 with respect to the speed of a visual target. (Meyer, C. H. et al., Vision Res. Vol. 25, No. 4, pp. 561-563, 1985).

Although Meyer has reported that a maximum pursuit speed limit of 100 deg/sec was obtained, Meyer has stated that such a pursuit speed was a result obtained from skilled test subjects and general test subjects were unable to perform such tracking. The condition of this experiment is a visual distance of 80 cm which greatly differs from the visual environments of movie theaters. The visual target is a light spot which moves by a galvanometer, and Meyer does not discuss the spatial frequency of the visual target.

In Japan, there is a report example of NHK which discusses frame rates (Yasushi Tadokoro, et al., NHK Technical Report, September (1968), pp. 422-426, 1968), but the condition of the report is a 14-inch monitor with a maximum luminance of 30 fl (102.78 cd/m$^2$) at a visual distance of 7H (H: screen height) and still does not allow for cinematic conditions. In addition, the report concludes that a field frequency of 60 Hz or higher is unnecessary for the reason why large motion does not appear in general contents. The conditions of Miyahara's experiment on dynamic visual acuity with respect to vibrating visual targets are a 14-inch monitor, a visual distance of 4H and a maximum luminance of 400 cd/m$^2$. Experiments concerning visual characteristics have been mainly conducted under visual environment conditions such as comparatively short distances and high luminances.

Therefore, the present inventor has conducted experimental examinations on the dynamic spatial frequency characteristics of the eyes in the visual environments of movie theaters, i.e., a maximum luminance of 40 cd/m$^2$ and a visual distance of 5 to 15 m. Research on moving image quality depending on such dynamic spatial frequency characteristics is important because such research leads to a great consideration of conventional formats for frame rates.

In the process of this research, the present inventor has actually examined the relationship between frame rates and moving image quality in higher frame rates and demonstrated human visual characteristics.

The present invention has been made in view of the above-mentioned situations, and intends to make it possible to present a moving image of less degradation to an observer who is a person viewing a displayed moving image, on the basis of human visual characteristics without unnecessarily increasing the frame rate.

SUMMARY

A first display apparatus of the present invention is characterized by including display control means for controlling display to cause display means to display a moving image made of not less than 105 frames/sec, and the display means for displaying the moving image made of not less than 105 frames/sec on the basis of control of the display control means, in which a display of each pixel on a screen is maintained during each frame period.

The display control means controls display to cause the display means to display a moving image made of not less than 230 frames/sec, and the display means is capable of displaying the moving image made of not less than 230 frames/sec on the basis of control of the display control means.

The display control means controls display to cause the display means to display a moving image made of not larger than 480 frames/sec, and the display means is capable of displaying the moving image made of not larger than 480 frames/sec on the basis of control of the display control means.

The display control means controls display to cause the display means to display a moving image made of 120 frames/sec, and the display means is capable of displaying the moving image made of 120 frames/sec on the basis of control of the display control means.

The display control means controls display to cause the display means to display a moving image made of 240 frames/sec, and the display means is capable of displaying the moving image made of 240 frames/sec on the basis of control of the display control means.

The display control means controls display to cause the display means to display a moving image made of 250 frames/sec, and the display means is capable of displaying the moving image made of 250 frames/sec on the basis of control of the display control means.

The display control means controls display to cause the display means to display a moving image made of 360 frames/sec, and the display means is capable of displaying the moving image made of 360 frames/sec on the basis of control of the display control means.

A first display method of the present invention is a display method for a display apparatus equipped with display means in which a display of each pixel on a screen is maintained during each frame period, and is characterized by including a display control step of controlling display to cause the display means to display a moving image made of not less than 105 frames/sec.

In the display control step, display is controlled to cause the display means to display a moving image made of not less than 230 frames/sec.

In the display control step, display is controlled to cause the display means to display a moving image made of not larger than 480 frames/sec.

In the display control step, display is controlled to cause the display means to display a moving image made of 120 frames/sec.

In the display control step, display is controlled to cause the display means to display a moving image made of 240 frames/sec.

In the display control step, display is controlled to cause the display means to display a moving image made of 250 frames/sec.

In the display control step, display is controlled to cause the display means to display a moving image made of 360 frames/sec.

A second display apparatus of the present invention is characterized by including display control means for controlling display to cause display means to display a moving image made of not less than 105 frames/sec, and the display means for displaying the moving image made of not less than 105 frames/sec on the basis of control of the display control means, the display means being matrix-driven.

The display control means controls display to cause the display means to display a moving image made of not less than 230 frames/sec, and the display means is capable of displaying the moving image made of not less than 230 frames/sec on the basis of control of the display control means.

The display control means controls display to cause the display means to display a moving image made of not larger than 480 frames/sec, and the display means is capable of displaying the moving image made of not larger than 480 frames/sec on the basis of control of the display control means.

The display control means controls display to cause the display means to display a moving image made of 120 frames/sec, and the display means is capable of displaying the moving image made of 120 frames/sec on the basis of control of the display control means.

The display control means controls display to cause the display means to display a moving image made of 240 frames/sec, and the display means is capable of displaying the moving image made of 240 frames/sec on the basis of control of the display control means.

The display control means controls display to cause the display means to display a moving image made of 250 frames/sec, and the display means is capable of displaying the moving image made of 250 frames/sec on the basis of control of the display control means.

The display control means controls display to cause the display means to display a moving image made of 360 frames/sec, and the display means is capable of displaying the moving image made of 360 frames/sec on the basis of control of the display control means.

A second display method of the present invention is a display method for a display apparatus equipped with matrix-driven display means, and is characterized by including a display control step of controlling display to cause the display means to display a moving image made of not less than 105 frames/sec.

In the display control step, display is controlled to cause the display means to display a moving image made of not less than 230 frames/sec.

In the display control step, display is controlled to cause the display means to display a moving image made of not larger than 480 frames/sec.

In the display control step, display is controlled to cause the display means to display a moving image made of 120 frames/sec.

In the display control step, display is controlled to cause the display means to display a moving image made of 240 frames/sec.

In the display control step, display is controlled to cause the display means to display a moving image made of 250 frames/sec.

In the display control step, display is controlled to cause the display means to display a moving image made of 360 frames/sec.

In the first display apparatus and the first display method according to the present invention, display is controlled to cause the display means in which the display of each pixel on the screen is maintained during each frame period to display a moving image made of not less than 105 frames/sec.

In the second display apparatus and the second display method according to the present invention, display is controlled to cause the matrix-driven display means to display a moving image made of not less than 105 frames/sec.

ADVANTAGE OF THE INVENTION

These and other embodiments of the present invention are contemplated and described herein. According to an aspect of the present invention, it is possible to present a moving image of less degradation to an observer who is a person viewing a displayed moving image, on the basis of human visual characteristics without unnecessarily increasing the frame rate.

BRIEF DESCRIPTION OF THE DRAWINGS

FIG. 13 A view for explaining recognition by the observer under image capture conditions, under display condition and under observation conditions.

FIG. 16 A view for explaining the result of evaluation of moving image quality in terms of jerkiness.

DETAILED DESCRIPTION

Description of Reference Numerals

1 . . . image display system, 11 . . . image signal conversion device, 12 . . . image display device, 21 . . . A/D conversion section, 22 . . . synchronizing signal detection section, 23 . . . frame memory, 24 . . . controller, 25 . . . D/A conversion section, 27 . . . display control section, 41 . . . scan control section, 43 . . . display section, 71 . . . image display system, 81 . . . image signal conversion section, 91 . . . data separation section, 92 . . . data holding section, 94 . . . controller, 93 . . . frame memory, 101 . . . image display system, 11 . . . signal processing section, 112 . . . clock/sampling pulse generation section, 113 . . . image display device, 121 . . . Y/C separation/chroma decoding section, 122 . . . A/D conversion section, 124 . . . synchronizing signal detection section, 125 . . . control signal generation section, 131 . . . LCD, 133-1 to 133-4 . . . data line driving circuits, 134 . . . gate line driving section, 141 . . . liquid crystal cell, 142 . . . TFT, 143 . . . capacitor.

BEST MODE FOR CARRYING OUT THE INVENTION

Embodiments of the present invention will be described below with reference to the accompanying drawings.

Figure 1:
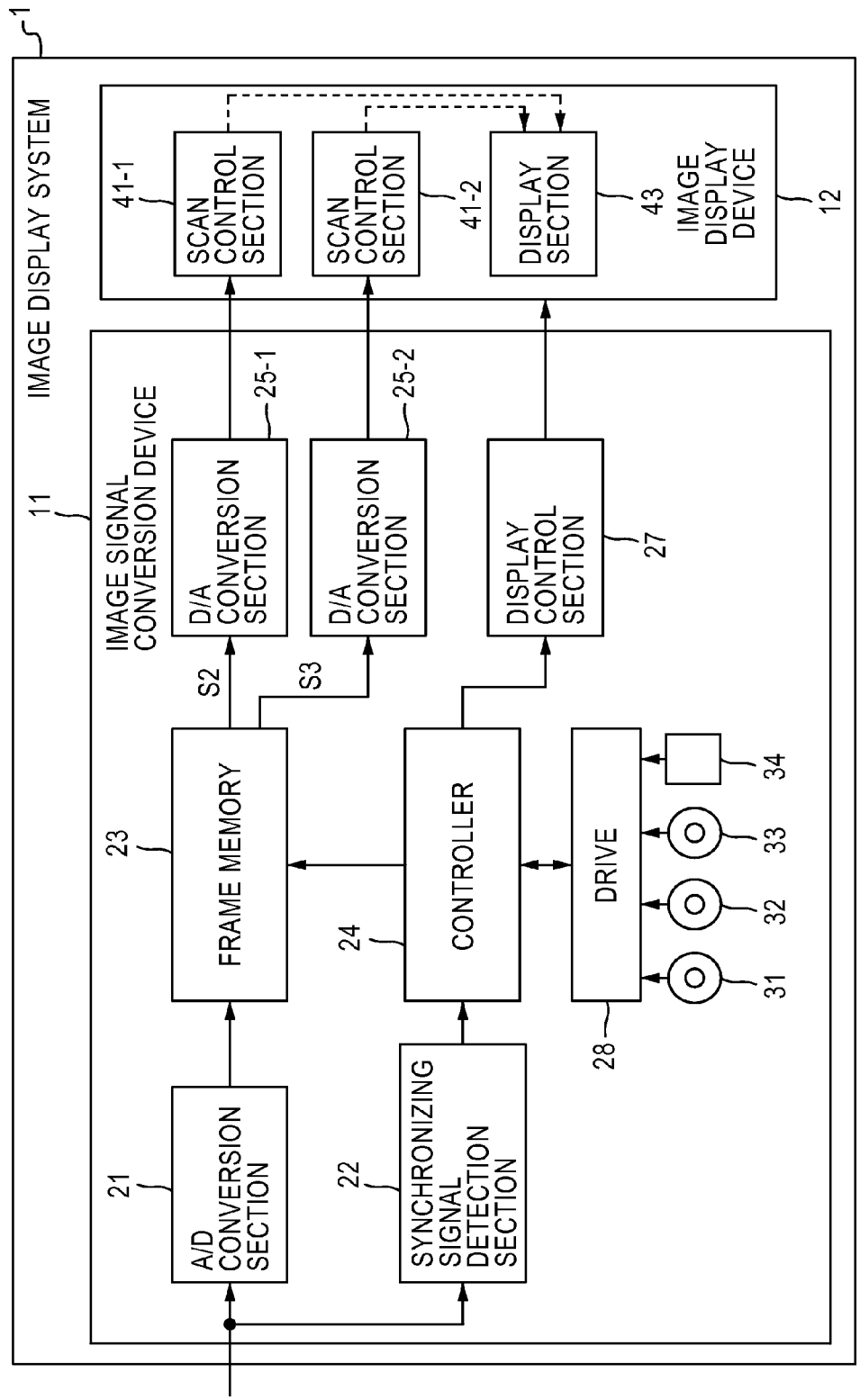
FIG. 1 A block diagram for explaining a first construction example of an image display system to which the present invention is applied.

FIG. 1 is a block diagram showing the construction of an image display system 1 to which the present invention is applied. The image display system 1 includes an image signal conversion device 11 and an image display device 12. The image display system 1 is constructed to be supplied with an analog image signal corresponding to a moving image, process the image signal in the image signal conversion device 11, and supply the processed image signal to the image display device 12 so that the moving image is displayed.

The analog image signal supplied to the image signal conversion device 11 is supplied to an A/D conversion section 21 and a synchronizing signal detection section 22.

The A/D conversion section 21 converts the analog image signal having a frame rate m into a digital image signal, and supplies the digital image signal to a frame memory 23. The synchronizing signal detection section 22 detects the frame rate and the dot clock of the image signal from the image signal, and generates a vertical synchronizing signal and a dot clock signal and supplies the vertical synchronizing signal and the dot clock signal to a controller 24. The dot clock is the reciprocal of the time required to display one dot on a display.

The controller 24 is supplied with the vertical synchronizing signal and the dot clock signal from the synchronizing signal detection section 22, and controls outputting of a video signal from the frame memory 23 and supplies information associated with the outputting of the video signal from the frame memory 23 to a display control section 27. The frame memory 23 outputs the supplied digital image signal to a D/A converter section 25-1 or a D/A conversion section 25-2 on the basis of the control of the controller 24.

The inputting and outputting of video signals to and from the frame memory 23 under the control of the controller 24 will be described below with reference to FIG. 2.

It is assumed that m denotes the frame rate of an input video signal S1 inputted to the frame memory 23. It is also assumed that frames sequentially inputted to the frame memory 23 are an α frame, an α+1 frame, an αx+2 frame, .... When the α frame and the α+1 frame are sequentially inputted to the frame memory 23, the controller 24 controls the frame memory 23 so that the α frame is outputted as an output video signal S2 to the D/A converter section 25 at α frame rate equal to ½ of the frame rate of the input video signal S1 and so that the α+1 frame is outputted as an output video signal S3 to the D/A conversion section 25-2 at a supply start time b which is delayed by 1/m from a supply start time a of the α frame.

The period of time taken to supply the α frame to the D/A converter section 25-1 is 2/m, and a supply end time c is 1/m behind the supply start time b of the α+1 frame to the D/A conversion section 25-2. Subsequently to the α+1 frame, the α+2 frame and the a+3 frame are sequentially inputted to the frame memory 23, and the controller 24 controls the frame memory 23 so that the α+2 frame is supplied as the output video signal S2 to the D/A converter section 25 at a frame rate equal to ½ of the frame rate of the input video signal S1 continuously with the supply of the α frame (i.e., at a supply time c). Similarly, the controller 24 supplies the α+3 frame as the output video signal S3 to the D/A conversion section 25-2 at a supply start time d which is delayed by 1/m from the supply start time c of the α+2 frame and is equal to a supply end time of the α+1 frame.

The deviation in supply timing between the output video signal S2 and the output video signal S3 is determined by a vertical synchronizing signal of the input video signal S1. More specifically, as shown in FIG. 2, the period between the supply start time a of the output video signal S2 and a supply start time f of an output video signal S3 is equal to one frame period of the input video signal S1. On the basis of the vertical synchronizing signal supplied from the synchronizing signal detection section 22, the controller 24 controls the supply timing of the output video signal S2 to the D/A converter section 25 and the supply timing of the output video signal S3 to the D/A conversion section 25-2.

Accordingly, the controller 24 controls the frame memory 23 so that the output video signal S2 and the output video signal S3 are respectively supplied to the D/A converter section 25 and the D/A conversion section 25-2 alternately on a frame by frame basis at a frame rate m/2 equal to ½ of the frame rate m of the input video signal S1 in such a manner that the supply start time of each frame of one of the output video signals S2 and S3 is shifted from the supply start time of each frame of the other by half (1/m) of a one-frame supply time (2/m) which is outputted.

Returning to the explanation of the image display system 1 shown in FIG. 1.

The D/A converter section 25-1 converts the supplied digital image signal into an analog image signal and supplies the analog image signal to a scan control section 41-1 of the image display device 12. The D/A conversion section 25-2 converts the supplied digital image signal into an analog image signal and supplies the analog image signal to a scan control section 41-2 of the image display device 12.

On the basis of information supplied from the controller 24, the display control section 27 controls the displaying of a moving image by the image display device 12 so that frame images corresponding to the output video signals S2 and S3 are displayed at a timing similar to that mentioned above with reference to FIG. 2.

As mentioned above with reference to FIG. 2, the frame rate of each of the output video signal S2 and the output video signal S3 is equal to ½ of the frame rate of the input video signal S1. More specifically, the dot clock of each of the output video signal S2 and the output video signal S3 is equal to ½ of the dot clock of the input video signal S1. On the basis of information associated with the output of the video signals from the frame memory 23 and supplied from the controller 24, the display control section 27 performs control so that the dot clock of each of the output video signal S2 and the output video signal S3 displayed on the image display device 12 becomes equal to ½ of the dot clock of the input video signal S1.

A drive 28 may be connected to the controller 24 if needed. A magnetic disk 31, an optical disk 32, a magneto-optical disk 33, or a semiconductor memory 34 is mounted in the drive 28 for transmission and reception of information.

The image display device 12 is supplied with two lines of analog video signals converted by the image signal conversion device 11, and displays on the basis of the control of the display control section 27 a moving image on a display section 43 by using the scan control section 41-1 and the scan control section 41-2.

The scan control section 41-1 is supplied with the analog video signal corresponding to the output video signal S2, which analog video signal is read from the frame memory 23 at the timing mentioned above with reference to FIG. 2 and is converted into the analog signal by the D/A converter section 25-1. Similarly, the scan control section 41-2 is supplied with the analog video signal corresponding to the output video signal S3, which analog video signal is read from the frame memory 23 at the timing mentioned above with reference to FIG. 2 and is converted into the analog signal by the D/A conversion section 25-2.

The scan control section 41-1 and the scan control section 41-2 display the respective supplied analog video signals on the display section 43 by a dot-sequential or line-sequential scan method. At this time, the scan control section 41-1 and the scan control section 41-2 can perform image display on the display section 43 at a frame rate twice as high as the frame rate at which the scan control section 41-1 or the scan control section 41-2 individually performs image drawing, by alternately scanning successive frames while shifting the scan start timing of each of the successive frames from that of the succeeding one by a ½ frame.

Figure 3:
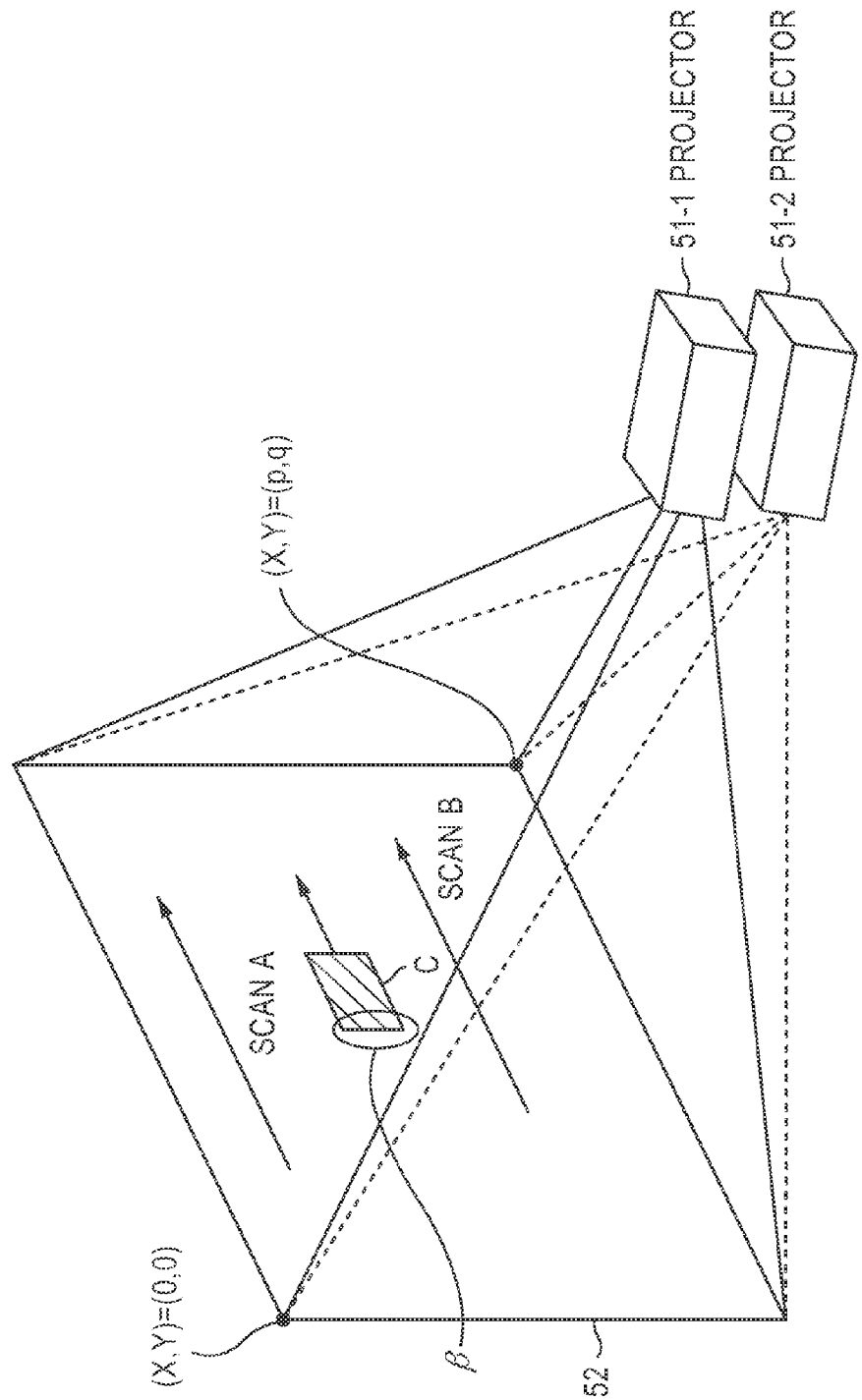
FIG. 3 A view for explaining a construction example of the image display device shown in FIG. 1.

The image display device 12 may be constructed not only as a single device but also as an image display system made of a plurality of devices. If the image display device 12 is constructed as an image display system, the image display system may be made of a projector 51-1, a projector 51-2 and a screen 52 as shown in FIG. 3 by way of example.

A specific operation of the image display device 12 will be described below with reference to an example which uses the projector 51-1, the projector 51-2 and the screen 52 shown in FIG. 3. The projector 51-1 corresponds to the scan control section 41-1 in FIG. 1, the projector 51-2 corresponds to the scan control section 41-2 in FIG. 1, and the screen 52 corresponds to the display section 43 in FIG. 1.

For example, the projector 51-1 is supplied with the analog video signal corresponding to the output video signal S2, which is read from the frame memory 23 at the timing mentioned above with reference to FIG. 2 and is converted into the analog signal by the D/A converter section 25-1. Similarly, the projector 51-2 is supplied with the analog video signal corresponding to the output video signal S3, which is read from the frame memory 23 at the timing mentioned above with reference to FIG. 2 and is converted into the analog signal by the D/A conversion section 25-2.

Each of the projector 51-1 and the projector 51-2 displays a frame image corresponding to the supplied video signal by scanning the screen 52 in the horizontal direction from a pixel $(X,Y)=(0, 0)$ to a pixel $(X,Y)=(p, q)$ which forms an image to be displayed, at the timing based on the control of the display control section 27. The frame rate of the frame image displayed by each of the projector 51-1 and the projector 51-2 is m/2. The scan start timing of each frame displayed by one of the projectors 51-1 and 51-2 is shifted by ½ from one frame of display provided by the other, as in the case of the output video signal SS and the output video signal S3 mentioned above with reference to FIG. 2, and the phase difference between their scans is 1/m.

For example, while the projector 51-2 is scanning a line corresponding to the α+1 frame on a line denoted by SCAN B on the screen 52, the projector 51-1 is scanning a line corresponding to the α+2 frame on a line denoted by SCAN A on the screen 52. The line denoted by SCAN B is a line shifted from the line denoted by SCAN A by ½ of the number of lines of one frame. More specifically, a moving image displayed on the screen 52 is alternately rewritten by the scan A and the scan B at a time interval of 1/m.

For example, if the frame rate of a display image outputted from each of the projector 51-1 and the projector 51-2 is 150 Hz, the frame rate of a moving image displayed on the screen becomes substantially 300 Hz.

In addition, in order to prevent a deviation from occurring between scan lines each of which is to be formed at the same position by a respective one of the scan A and the scan B, it is possible to correct scan positions of pixels by using a technique similar to optical position correction of images which is used in a conventional so-called twin stack technique. The twin stack technique is a technique capable of displaying a bright image by using two projectors to display the same image at the same position at the same time. When an image is displayed by using the twin stack technique, the luminance of the image displayed becomes twice as high, so that clear projection can be achieved even in the case of bright environments or long projection distances.

The use of the twin stack technique entails the problem that an image blur occurs due to a deviation between the pixel positions of two projected images, but a so-called picture shift function to enable fine adjustment of the pixel positions of optically projected images is widely used to solve such problem. According to the picture shift function, the positions of images projected from two projectors can be made precisely coincident with each other.

A technique of correcting a deviation between the pixel positions of two projected images is disclosed in Japanese Patent Application No. HEI 10-058291, for example.

The image display device 12 becomes able to display a moving image without causing an image blur due to an overlap of images shifting from each other by one frame, by being adjusted so that the deviation between scan lines formed by the scan A and the scan B becomes not greater than one pixel (one dot or one pixel).

As mentioned above, in the case where the projector 51-1 and the projector 51-2 alternately draw frame images on α frame by frame basis while shifting each of the frame images from the succeeding one by a ½ frame, scanning for drawing an image of one frame is started by one of the projectors earlier than the previous one frame is completely scanned and drawn by the other. At this time, when an object C displayed on the screen 52 in FIG. 3 is displayed to move, for example, from left to right on the display screen, the smoothness of movement of an edge section β is perceived as the smoothness of a displayed image by a user who observes the moving image.

Figure 4:
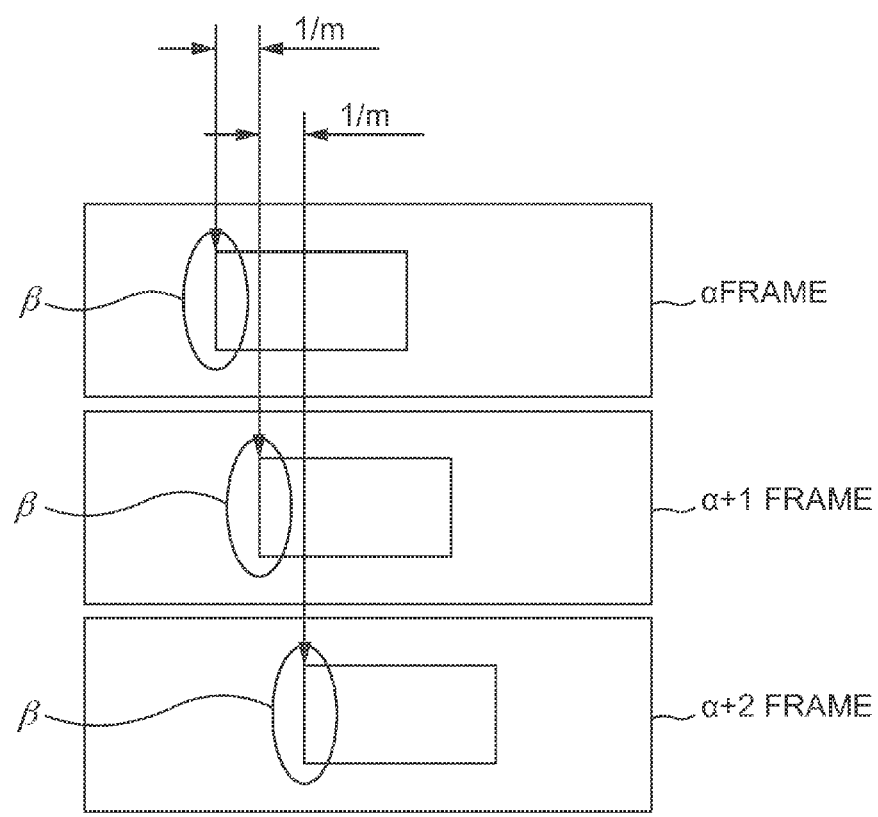
FIG. 4 A diagram for explaining the rate of updating of an edge section of a moving image displayed on the image display device shown in FIG. 3.

The displaying of the edge section β of the object C on the screen 52 will be described below with reference to FIG. 4.

The object C of the α frame is displayed by the projector 51-1, and after a period of 1/m sec, the object C of the α+1 frame is displayed by the projector 51-2. The position of the edge section β of the object C at this time is rewritten after a period of 1/m from the display of the α frame. Then, after a period of 1/m, the object C of the α+2 frame is displayed by the projector 51-1. The edge section β of the object C is rewritten after a period of 1/m from the display of the α+1 frame.

For example, when the frame rate of a display image outputted from each of the projector 51-1 and the projector 51-2 is 150 Hz, the frame of a moving image displayed by each individual one of the projector 51-1 and the projector 51-2 is rewritten at an interval of 1/150 (sec). However, the edge section β of the object C which is displayed on the screen 52 by displaying frame images alternately on a frame by frame basis by means of the projector 51-1 and the projector 51-2 is refreshed at an interval of 1/300 (sec). Accordingly, the movement of the edge section β of the object C which is observed by the user becomes extremely smooth.

The image display device 12 has been described as being constructed to controlling display of images under the control of the display control device 27. However, the image display device 12 may internally have the display control section 27 so as to be supplied with control signals necessary for image display from the controller 24, or may internally have a control section different from the display control section 27 so as to be supplied with vertical synchronizing signals and dot clock signals from the display control section 27 in order to control the operations of the projector 51-1 and the projector 51-2 mentioned above with reference to FIG. 3 by way of example.

The operation of the image display device 12 has been mentioned above with illustrative reference to a projection display system made of the projector 51-1, the projector 51-2 and the screen 52. However, the image display device 12 may use any other display system capable of drawing an image by a dot-sequential or line-sequential method, as long as the display system can cause two display devices to alternately scan successive frames with a shift of a ½ frame and perform display of moving images at α frame rate twice as high as the frame rate of each individual one of the two display devices.

The image display device 12 may use a device which performs drawing of images by a dot-sequential or line-sequential method, for example, a direct-view-type display or a projector using a CRT (Cathode Ray Tube), an LCD (Liquid Crystal Display), a GLV (Grating Light Valve), an LED (Light Emitting Diode) or an FED (Field Emission Display).

For example, the GLV is an image display technique using a micro ribbon array which is a projection device for controlling the direction, the color and the like of light by using a light diffraction effect. The micro ribbon array includes miniature light diffraction devices arranged in a line, and the GLV performs projection of images by irradiating laser light onto the micro ribbon array. The ribbons can be independently driven by electrical signals, and the amount of driving of each of the ribbons can be adjusted to vary the amount of light diffraction and produce light and shade in an image by means of the difference between each of the ribbons. Accordingly, the GLV can realize smooth gradational representation and high contrast.

The LED is a device formed by a junction of two kinds of semiconductors and capable of emitting light when current is applied.

The FED is a device capable of obtaining an image by an emission principle similar to a CRT which emits light by taking electrons out of the cathode and colliding the electrons against a fluorescent material coated on the anode. However, the cathode of the CRT has a structure using a point electron source, whereas the cathode of the FED has a structure using a surface electron source.

Figure 5:
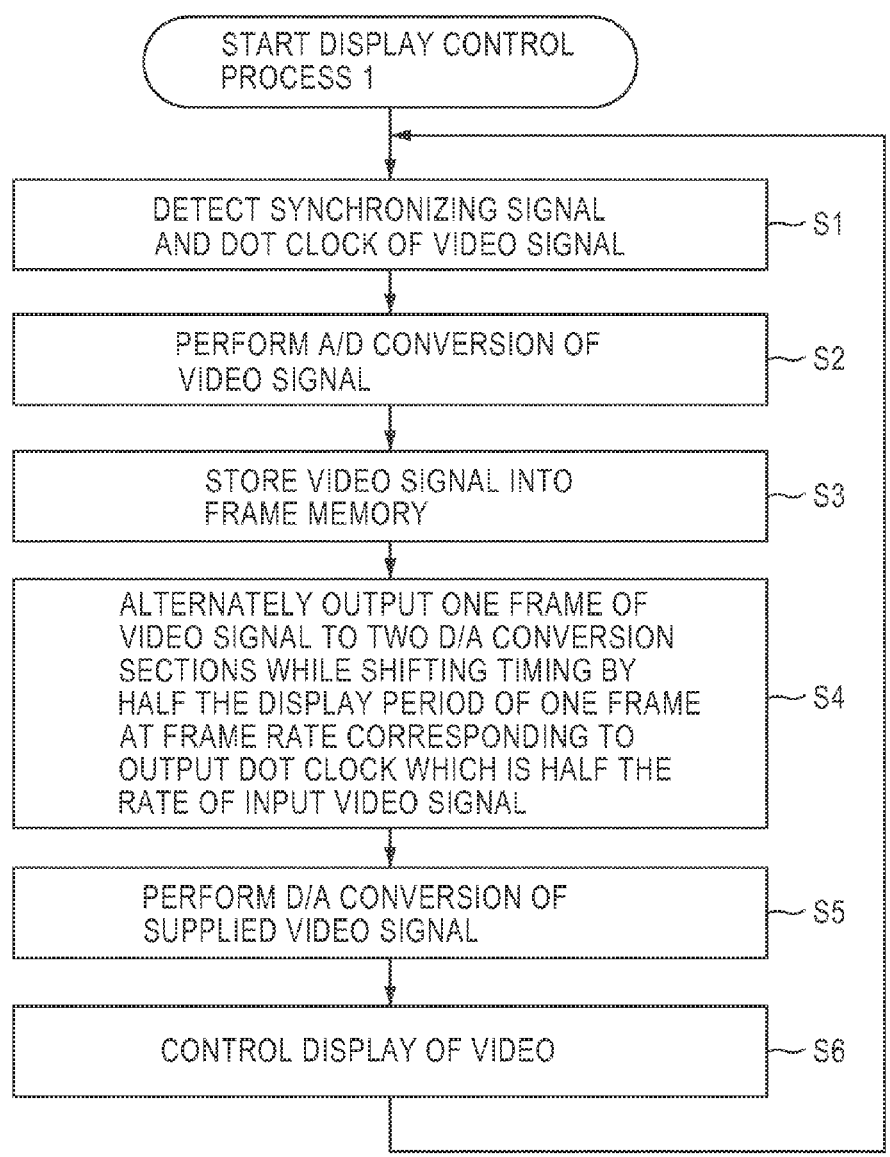
FIG. 5 A flowchart for explaining a display control process 1 to be executed by the image display system shown in FIG. 1.

A display control process 1 to be executed by the image display system 1 shown in FIG. 1 will be described below with reference to the flowchart shown in FIG. 5.

In step S1, the synchronizing signal detection section 22 detects a synchronizing signal and a dot clock from a supplied analog video signal, and supplies the vertical synchronizing signal and the dot clock signal to the controller 24.

In step S2, the A/D conversion section 21 performs A/D conversion of the supplied analog video signal, and supplies a digital video signal to the frame memory 23.

In step S3, the frame memory 23 sequentially stores the supplied digital video signal.

In step S4, as mentioned above with reference to FIG. 2, in accordance with the control of the controller 24, the frame memory 23 alternately outputs the video signal on a frame by frame basis to the two D/A converter sections 25-1 and 25-2 at a frame rate corresponding to an output dot clock whose rate is half the rate of the input video signal S1, while shifting each frame from the succeeding one by half the period of scan required for display of one frame. The video signal outputted to the D/A converter section 25-1 is the output video signal S2, while the video signal outputted to the D/A conversion section 25-2 is the output video signal S3.

In other words, the controller 24 controls the frame memory 23 to separate the frames stored in the frame memory 23 into odd frames and even frames and shift each of the odd and even frames from the succeeding one by a period which is half the period of scan required for display of one frame, so as to alternately output the frames to the D/A conversion section 25-1 and the D/A conversion section 25-2.

In step S5, the D/A conversion section 25-1 and the D/A conversion section 25-2 perform D/A conversion of the supplied video signals, and supply analog video signals to the image display device 12.

In step S6, the display control section 27 controls the scan control section 41-1 and the scan control section 41-2 (in FIG. 3, the projector 51-1 and the projector 51-2) of the image display device 12 at a timing similar to that used in the case of the output video signal S2 and the output video signal S3 mentioned above with reference to FIG. 2, and shifts the scan start time of each of the frames from that of the succeeding one by a period which is half the period of scan required for display of one frame, thereby alternately scanning individual frames of video signals on a frame by frame basis so as to display a video image on the display section 43 (in FIG. 3, the screen 52) at a display frame rate which is substantially twice as high as the frame rate of each of the scan control section 41-1 and the scan control section 41-2. The display control section 27 controls the image display device 12 in this manner, and completes the process.

Through the above-mentioned process, the moving image to be displayed is separated into odd and even frames, and the odd and even frames are respectively supplied to the two display devices. Then, the respective display devices scan the odd and even frames with a shift of a ½ frame at a frame rate which is half the frame rate of the moving image to be displayed, so that the moving image can be displayed at a frame rate twice as high as the capability of the display devices.

In addition, by adjusting the scan position accuracy of two scan lines to a position deviation of not greater than one dot (one pixel), it is possible to clearly display a moving image without an image blur due to an overlap of images which shift from each other by one frame.

Figure 2:
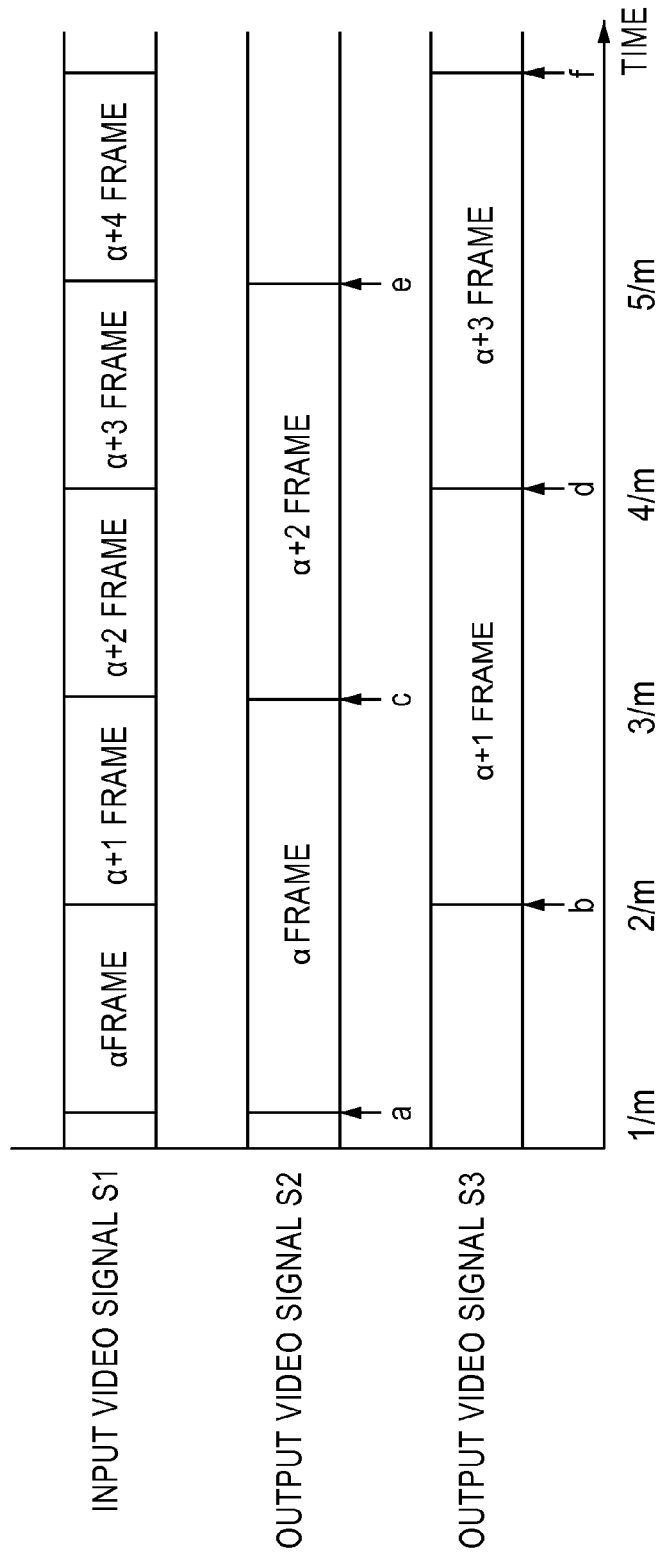
FIG. 2 A diagram for explaining the timing of an input video signal and output video signals.

In addition, if each of the projector 51-1 and the projector 51-2 is a so-called liquid crystal projector, a shutter may be provided in front of the projection lens of the projector 51-1, which shutter passes light for displaying an image projected by the projector 51-1, for example, between the supply start time a and the supply start time b, between the supply start time c and the supply start time d, and between the supply start time e and the supply start time f in FIG. 2, and blocks light for displaying an image projected by the projector 51-1, between the supply start time b and the supply start time c and between the supply start time d and the supply start time e in FIG. 2. In addition, a shutter may be provided in front of the projection lens of the projector 51-2, which shutter passes light for displaying an image projected by the projector 51-2, for example, between the supply start time b and the supply start time c and between the supply start time d and the supply start time e in FIG. 2, and blocks light for displaying an image projected by the projector 51-2, between the supply start time a and the supply start time b, between the supply start time c and the supply start time d, and between the supply start time e and the supply start time f in FIG. 2.

More specifically, the shutter provided in front of the projection lens of the projector 51-1 transmits or blocks light for displaying an image projected by the projector 51-1, so as to display the $\alpha$ frame, the $\alpha+2$ frame, the $\alpha+4$ frame, . . . , all of which are synchronized with the input video signal S1 shown in FIG. 2, i.e., only ($\alpha+2\times n$) frames (n is an integer) synchronized with the input video signal S1. The shutter provided in front of the projection lens of the projector 51-2 transmits or blocks light for displaying an image projected by the projector 51-2, so as to display the $\alpha+1$ frame, the $\alpha+3$ frame, . . . , all of which are synchronized with the input video signal S1 shown in FIG. 2, i.e., only ($\alpha+2\times n+1$) frames (n is an integer) synchronized with the input video signal S1.

In addition, each of the shutters may be a liquid crystal shutter or a mechanical shutter, and needs only to be able to transmit or block light at an interval of a predetermined period.

In addition, each of the shutters may be provided in the projector 51-1 or the projector 51-2, for example, between a light source and a liquid crystal device, or behind the liquid crystal device.

Figure 6:
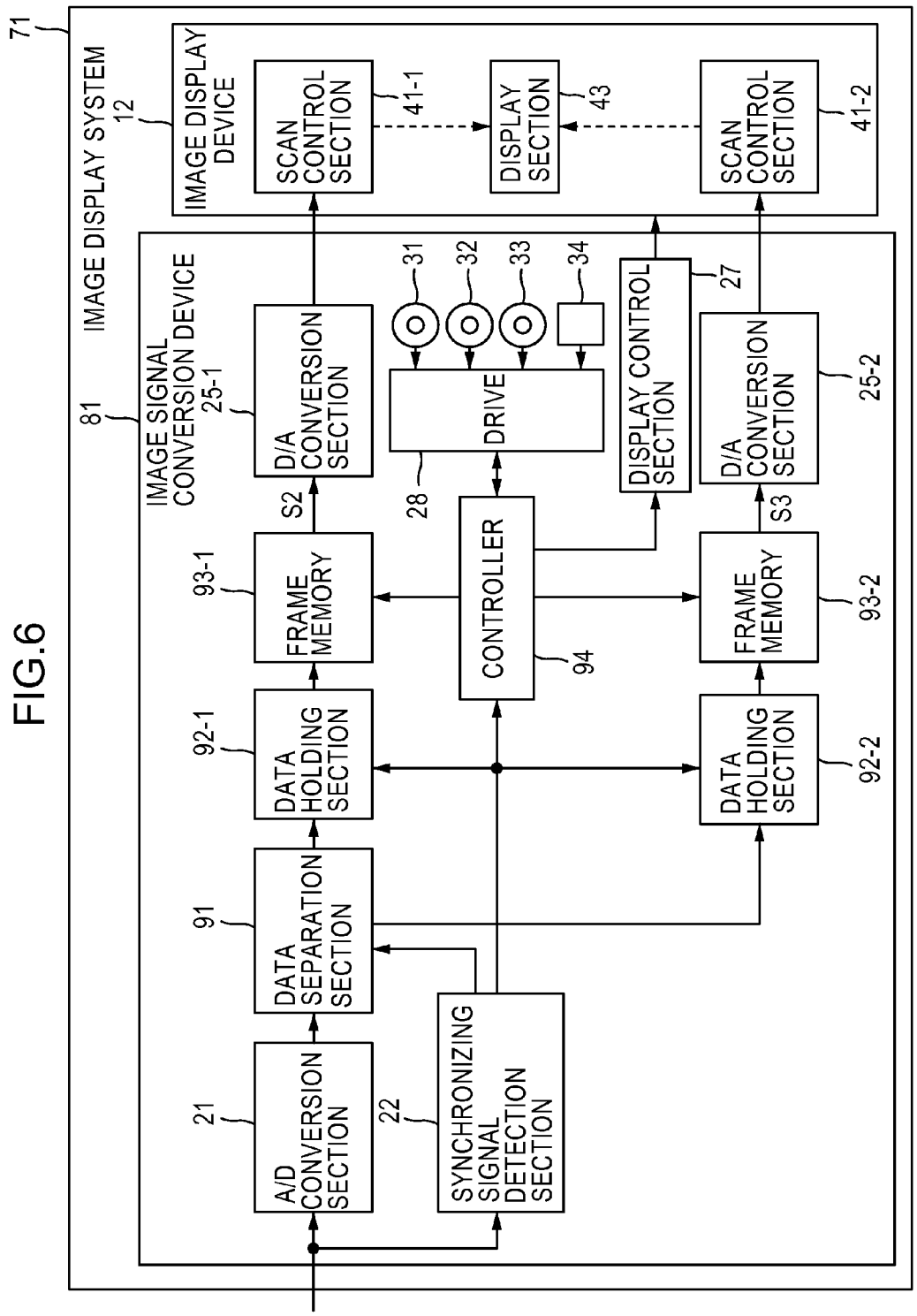
FIG. 6 A block diagram for explaining a second construction example of the image display system to which the present invention is applied.

FIG. 6 is a block diagram showing the construction of an image display system 71 to which the present invention is applied and which has a construction different from that of the image display system 1 shown in FIG. 1.

Identical reference numerals are used to denote sections corresponding to those shown in FIG. 1, and the description of the same sections is omitted.

The image display system 71 shown in FIG. 6 causes the image display device 12 similar to that used in the image display system 1 shown in FIG. 1 to display moving images, but converts image signals by using an image signal conversion device 81 different from the image signal conversion device 11 shown in FIG. 1.

An analog image signal supplied to the image signal conversion device 81 is supplied to the A/D conversion section 21 and the synchronizing signal detection section 22.

The A/D conversion section 21 converts the analog image signal having $\alpha$ frame rate m into a digital image signal, and supplies the digital image signal to a data separation section 91. The synchronizing signal detection section 22 detects the frame rate and the dot clock of the image signal from the image signal and generates a vertical synchronizing signal and a dot clock signal and supplies the vertical synchronizing signal and the dot clock signal to the data separation section 91, a data holding section 92-1, a data holding section 92-2, and a controller 94.

On the basis of the vertical synchronizing signal supplied from the synchronizing signal detection section 22, the data separation section 91 separates the supplied digital image signal into individual frames and alternately supplies the frames to the data holding section 92-1 or the data holding section 92-2 on a frame by frame basis. The data separation section 91 supplies, for example, odd frames to the data holding section 92-1 and even frames to the data holding section 92-2.

The data holding section 92-1 serves as an interface between the data separation section 91 and a frame memory 93-1, and the data holding section 92-2 serves as an interface between the data separation section 91 and a frame memory 93-2. Each of the data holding sections 92-1 and 92-1 supplies the supplied image signal to the frame memory 93-1 or the frame memory 93-2 on a frame by frame basis on the basis of the vertical synchronizing signal supplied from the synchronizing signal detection section 22.

The controller 94 is supplied with the vertical synchronizing signal and the dot clock signal from the synchronizing signal detection section 22, and controls the output timing of the video signal of the frame memory 93-1 and the frame memory 93-2.

The frame memory 93-1 supplies the video signal to the D/A conversion section 25-1 on the basis of the control of the controller 94. The frame memory 93-2 supplies the video signal to the D/A conversion section 25-2 on the basis of the control of the controller 94.

If it is assumed here that the signal supplied to the data separation section 91 is the input video signal S1, that the signal outputted from the frame memory 93-1 is the output video signal S2, and that the signal outputted from the frame memory 93-2 is the output video signal S3, the input-output relationship between these signals is similar to that mentioned above with reference to FIG. 2.

FIG. 2 does not give consideration to delay of signals caused by a data separation process in the data separation section 91 or the like, but the controller 94 may be adapted to adjust the delay of signals and a deviation in timing between the two lines of video signals by means of, for example, the signal output timings of the data holding section 92-1 and the data holding section 92-2.

The D/A conversion section 25-1 converts the supplied digital image signal into an analog image signal and supplies the analog image signal to the image display device 12. The D/A conversion section 25-2 converts the supplied digital image signal into an analog image signal and supplies the analog image signal to the image display device 12.

The display control section 27 controls display of a moving image on the image display device 12 on the basis of information supplied from the controller 94, and displays frame images corresponding to the output video signal S2 and the output video signal S3 at a timing similar to that mentioned above with reference to FIG. 2.

The drive 28 may be connected to the controller 24 if needed. The magnetic disk 31, the optical disk 32, the magneto-optical disk 33, or the semiconductor memory 34 is mounted in the drive 28 for transmission and reception of information.

Figure 7:
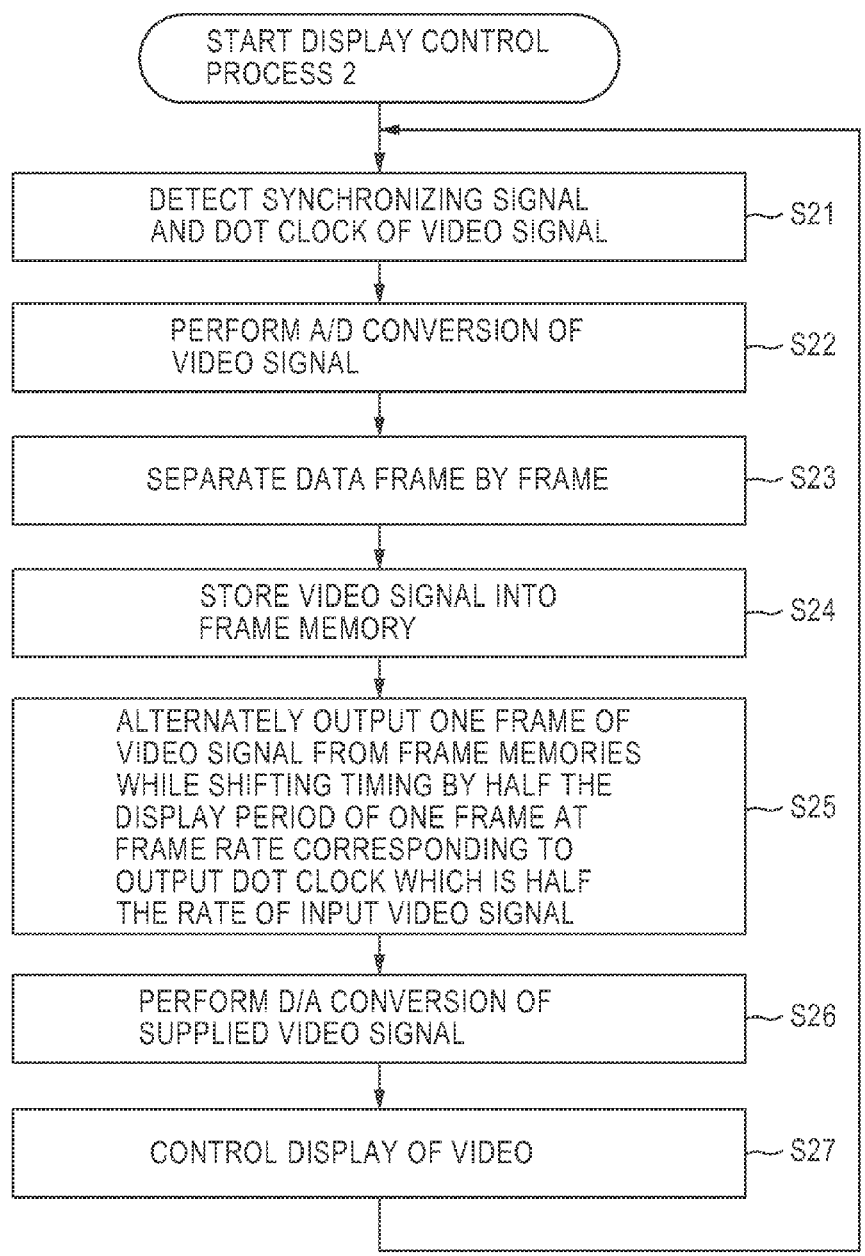
FIG. 7 A flowchart for explaining a display control process 2 to be executed by the image display system shown in FIG. 6.

A display control process 1 to be executed by the image display system 61 shown in FIG. 6 will be described below with reference to the flowchart shown in FIG. 7.

In step S21, the synchronizing signal detection section 22 detects a synchronizing signal and a dot clock from a supplied analog image signal and supplies a vertical synchronizing signal and a dot clock signal to the data separation section 91, the data holding section 92-1, the data holding section 92-2, and the controller 94.

In step S22, the A/D conversion section 21 performs A/D conversion of the supplied analog video signal, and supplies a digital video signal to the data separation section 91.

In step S23, on the basis of the vertical synchronizing signal supplied from the synchronizing signal detection section 22, the data separation section 91 separates the supplied analog video signal into individual frames and alternately supplies the frames to the data holding section 92-1 or the data holding section 92-2 on a frame by frame basis. The data separation section 91 supplies, for example, odd frames to the data holding section 92-1 and even frames to the data holding section 92-2.

In step S24, each of the data holding section 92-1 and the data holding section 92-2 supplies the supplied video signal to the frame memory 93-1 or the frame memory 93-2 and causes the frame memory 93-1 or the frame memory 93-2 to store the supplied video signal.

In step S25, the controller 94 controls the frame memory 93-1 and the frame memory 93-2 so that one frame of video signal is alternately outputted on a frame by frame basis from the frame memory 93-1 to the D/A conversion section 25-1 and from the frame memory 93-2 to the D/A conversion section 25-2 at α frame rate corresponding to an output dot clock equal to half the dot clock of the input video signal S1, while shifting each frame from the succeeding frame by a period which is half the period of scan required for display of one frame. More specifically, if it is assumed here that the signal supplied to the data separation section 91 is the input video signal S1, that the signal outputted from the frame memory 93-1 is the output video signal S2, and that the signal outputted from the frame memory 93-2 is the output video signal S3, the input-output relationship between these signals is similar to that mentioned above with reference to FIG. 2.

In step S26, each of the D/A conversion section 25-1 and the D/A conversion section 25-2 performs D/A conversion of the supplied video signal, and supply an analog video signal to the image display device 12.

In step S27, the display control section 27 controls the scan control section 41-1 and the scan control section 41-2 (in FIG. 3, the projector 51-1 and the projector 51-2) of the image display device 12 at a timing similar to that used in the case of the output video signal S2 and the output video signal S3 mentioned above with reference to FIG. 2, and shifts the scan start time of each of the frames from that of the succeeding one by a period which is half the period of scan required for display of one frame, thereby alternately scanning individual frames of video signals on a frame by frame basis so as to display a video image on the display section 43 (in FIG. 3, the screen 52) at a display frame rate which is substantially twice as high as the frame rate of each of the scan control section 41-1 and the scan control section 41-2. The display control section 27 controls the image display device 12 in this manner, and completes the process.

Even in the image display system 71 shown in FIG. 6, as in the case of the image display system shown in FIG. 1, through the above-mentioned process, the moving image to be displayed is separated into odd and even frames, and the odd and even frames are respectively supplied to two display devices, i.e., the scan control section 41-1 and the scan control section 41-2. Then, the respective display devices scan frame images with a shift of a ½ frame at a frame rate which is half the frame rate of the moving image to be displayed, so that the moving image can be displayed at a frame rate substantially twice as high as the capability of the display devices.

In the above description of the embodiment of the present invention, reference has been made to a case where a supplied image signal is separated into two lines of image signals and an image is drawn by two scan control sections, but the separation number of image signals may be any number not less than two.

Figure 8:
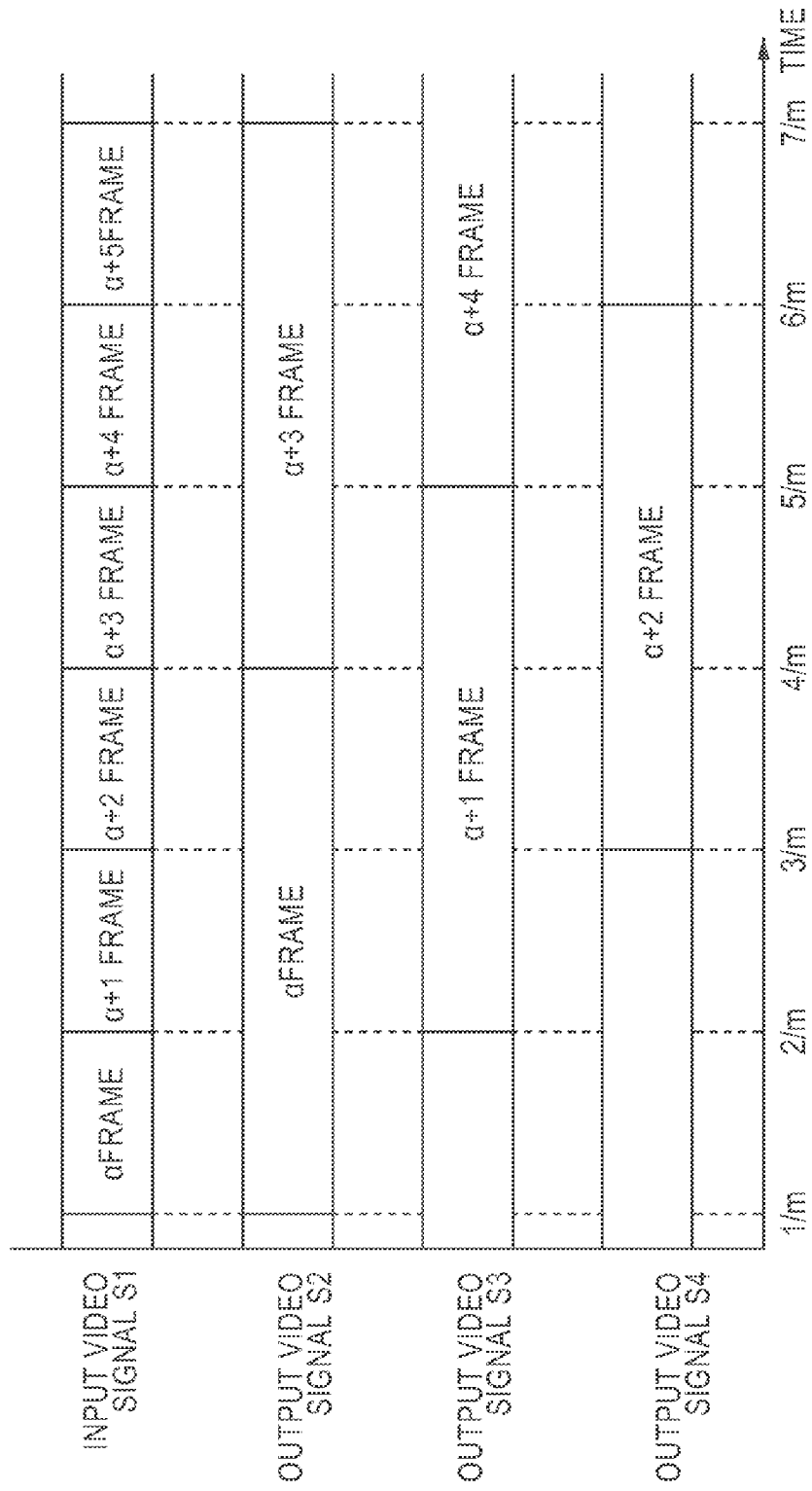
FIG. 8 A diagram for explaining the timing of an input video signal and output video signals.

If the separation number of image signals is, for example, three, image signals outputted from the frame memories are sequentially supplied to three D/A conversion sections or frames separated into three by the data separation section are sequentially supplied to and stored in three frame memories, respectively. Thus, as shown in FIG. 8, the input video signal S1 is separated into the three output video signals S2, S3, and S4, and the three output video signals S2, S3, and S4 are respectively supplied to three scan control sections.

The first scan control section controls the display of the α frame, the α+3 frame, the α+6 frame, . . . , all of which correspond to the output video signal S2. The second scan control section controls the display of the α+1 frame, the α+4 frame, the α+7 frame, . . . , all of which correspond to the output video signal S3. The third scan control section controls the display of the α+2 frame, the α+5 frame, the α+8 frame, . . . , all of which correspond to the output video signal S4. The frame rate of frames of the output video signals respectively displayed by the first scan control section, the second scan control section and the third scan control section is ⅓ of the frame rate of the input video signal, and the scan start times of frames respectively scanned by the first scan control section, the second scan control section and the third scan control section are shifted from one another by ⅓ of the period of scan required for display of one frame of each of the output video signals S2 to S4.

If the input video signal S1 is, for example, 180 Hz, the input video signal S1 is separated into three output video signals S2, S3, and S4, and the three output video signals S2, S3, and S4 are respectively supplied to the three scan control sections and are scanned and displayed as output video signals at a frame rate of 60 Hz by the respective scan control sections. If the frame rate of the input video signal S1 is, for example, 150 Hz, the input video signal S1 is separated into three output video signals S2, S3, and S4, and the three output video signals S2, S3, and S4 are respectively supplied to the three scan control sections and are scanned and displayed as output video signals at a frame rate of 50 Hz by the respective scan control sections. In this manner, scan control sections of the presently most widely used type capable of displaying images at 50 Hz (PAL: Phase Alternating Line) or 60 Hz (NTSC: National Television System Committee or HD (High Definition) video signals) can be employed to display moving images at far higher frame rates.

Although the NTSC frame rate is more properly 59.94 frames/sec, the NTSC frame rate herein referred to is defined as 60 frames/sec, according to conventions of those skilled in the art. The multiples of 59.94 are similarly referred to as those of 60. More specifically, 59.94, 119.88, 179.82, 239.76, 299.70, 359.64, 418.58 and 479.52 are herein referred to as 60, 120, 180, 240, 300, 360, 420 and 480, respectively.

Accordingly, if the separation number of the input video signal is, for example, n, n number of scan control sections are provided, and the frame rate of frames of output video signals respectively displayed by the first to n-th scan control sections is 1/n of the frame rate of the input video signal. The drawing start times of frames respectively scanned by the first to n-th scan control sections are shifted from one another by 1/n of the display period of one frame of the respective output video signals, so that a moving image can be displayed at a frame rate substantially n times as high, compared to the case where each of the scan control sections individually display a moving image.

In addition, the number of scan control sections may be set to s and the separation number of a video signal may be set to n smaller than s so that a moving image is displayed by using n number of scan control sections from among the s number of scan control sections.

In the above description made in connection with FIG. 1 and FIG. 6, reference has been made to image display systems, each made of an image signal conversion device and an image display device, but, as a matter of course, each of the constituent elements may be realized as a single device.

The image signal conversion device 11 shown in FIG. 1 has been described on the assumption that the controller 24 controls the frame memory 23 and the display control section 27 controls the image display device 12, while the image signal conversion device 81 shown in FIG. 6 has been described on the assumption that the controller 94 controls the frame memory 93-1 and the frame memory 93-2 and the display control section 27 controls the image display device 12. However, a frame memory for storing a video signal and an image display device for displaying an image may be controlled by the same controller. The display control section 27 may be provided not in the image signal conversion device 11 or 81 but in the image display device 12.

Moving images entail peculiar image quality degradation which does not occur in still images. In the presently most widely used types of displays of 50 Hz (PAL) and 60 Hz (NTSC and HD video signals), reproduction in a temporal direction is imperfect, and under particular conditions, this imperfectness in the temporal direction is translated into the imperfectness in a spatial direction. Accordingly, image quality degradation of moving images occurs due to, for example, shutter periods used for acquisition of moving image data, emission periods of display devices during display of moving images, and the line-of-sight conditions of individual persons.

Figure 9:
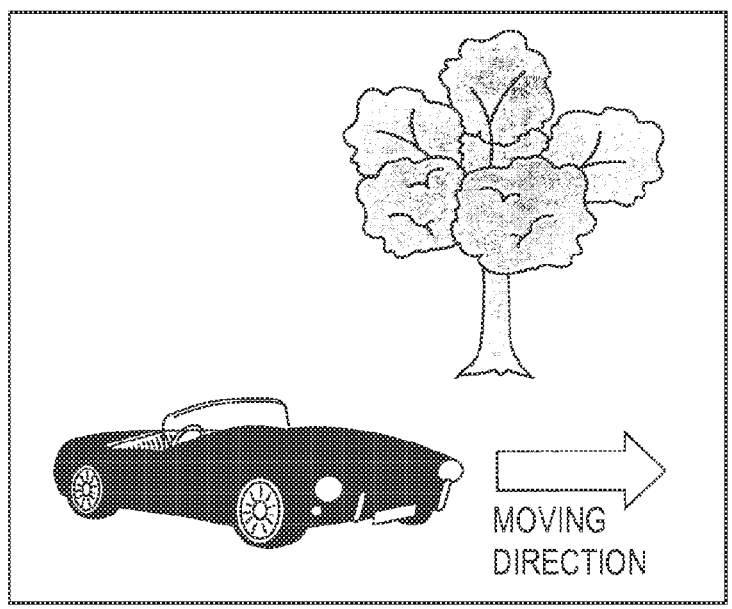
FIG. 9 A view showing an example of an actual scene in which a moving object and a stationary object exist together.

FIG. 9 shows an example of an actual scene in which a stationary object and a moving object exist together. This scene assumes that a car move toward the right and a tree is fixed to the ground. Recognition by an observer who is observing the scene shown in FIG. 9 is shown in FIGS. 10 and 11.

Figure 10:
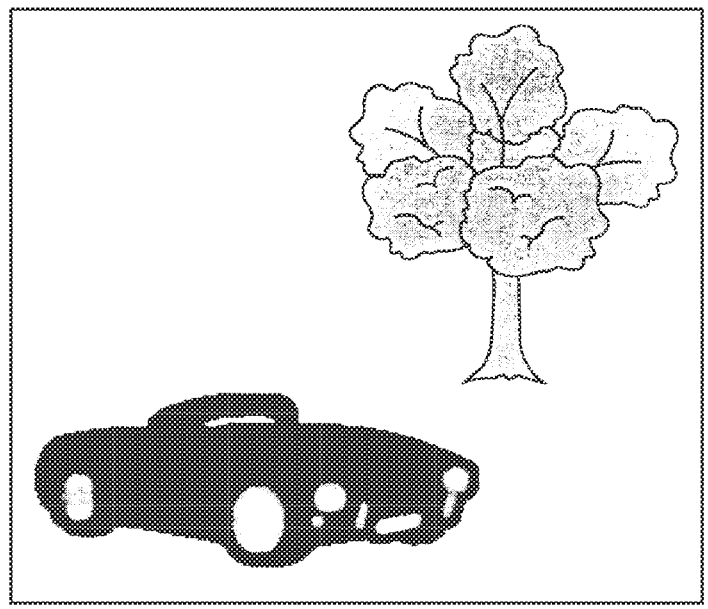
FIG. 10 A view for explaining a fixation condition.
Figure 11:
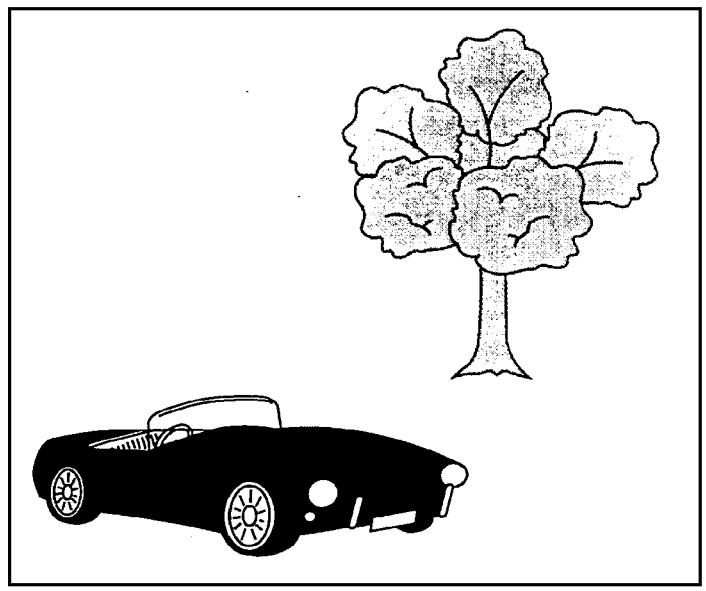
FIG. 11 A view for explaining a tracking condition.

FIG. 10 is a view showing the recognition of a video image by the observer who is gazing at the tree. In this case, the car moving toward the right is indistinctly visible from the observer. FIG. 11 is a view showing the recognition of a video image by the observer who is gazing at the car. In this case, the stationary tree is indistinctly visible from the observer.

In the following description, the case where the observer fixes his/her line of sight on a fixed object on observation plane coordinates is referred to as the fixation condition, while the case which the observer causes the line of sight to track a moving object on observation plane coordinates is referred to as the tracking condition. More specifically, the case mentioned in connection with FIG. 10 corresponds to the fixation condition, and the case mentioned in connection with FIG. 11 corresponds to the tracking condition. Under both the fixation condition and the tracking condition, an object which is gazed at by the observer is clearly visible, while an object which varies in relative position with respect to an object which is gazed at is indistinctly visible.

The reason for this is that the visual characteristics of a person have the function of integrating light incident on the retina within a particular period. An object moving on the retina coordinates of the eyes shows a position change which is integrated in the temporal direction, so that the moving object is perceived as a blurred image. This blur increases in proportion to a moving speed on the retina coordinates. The moving speed on the retina coordinates corresponds to not an actual speed of the object but an angular speed (deg/sec) thereof.

As mentioned above, an object which is stationary on the retina coordinates is clearly visible, and an object moving on the retina coordinates is indistinctly visible. A video image which coincides with such actual recognition is important to reproduce in order to display a moving image having reality, i.e., a moving image of high quality which appears to be smoothly moving.

Figure 12:
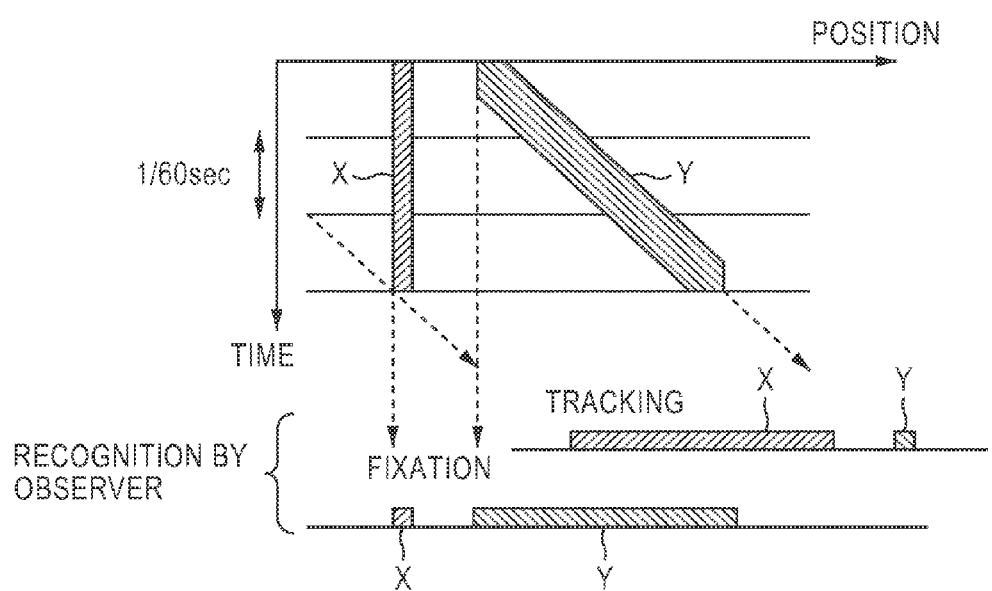
FIG. 12 A view for explaining recognition by an observer during tracking and fixation.

The difference between the recognition by the observer which has been mentioned above with reference to FIG. 10 and the recognition by the observation which has been mentioned above with reference to FIG. 11 will be described below with reference to FIG. 12. The top section of FIG. 12 shows an actual movement in the outside world. The vertical axis represents a time axis and the horizontal axis represents a horizontal direction, and the top section of FIG. 12 shows the positions of dots at each time in a scene in which a fixed dot (corresponding to the tree in FIGS. 9 to 11 and denoted by x in FIG. 12) and a dot moving at a constant speed (corresponding to the car in FIGS. 9 to 11 and denoted by y in FIG. 12) exist in the outside world. The bottom section of FIG. 12 shows the recognition of the movement in the outside world by the observer during fixation and tracking. Arrows shown by dashed lines indicate the motion of the visual point of the observer, i.e., the direction of integration of a video image on the retina. Arrows extending in the vertical direction indicate the direction of integration during fixation, and arrows extending in the oblique direction indicate the direction of integration during tracking. More specifically, while the observer is tracking, the fixed dot (tree) is indistinctly visible, but the moving dot (car) is clearly visible. On the other hand, while the observer is fixating, the fixed dot (tree) is clearly visible, but the moving dot (car) is indistinctly visible.

The recognition of the movement in the outside world shown in FIG. 9 by the observer when the movement captured by a fixed image capture method is reproduced as a moving image will be described below with reference to FIG. 13 in terms of image capture conditions, display conditions, and observation conditions. The top section of FIG. 13 shows a temporal variation in the display of the moving image. The bottom section of FIG. 13 shows, as recognition by the observer, results obtained by integrating light displayed as a moving image in the directions of motions of the line of sight during fixation and tracking, i.e., in the direction of the integration axis.

FIG. 13A shows recognition by the observer in the case of an image which is captured by an open shutter technique and displayed by a pulse-type display. FIG. 13B shows recognition by the observer in the case of an image which is captured by an open shutter technique and displayed by a hold-type display. FIG. 13C shows recognition by the observer in the case of an image which is captured by a high-speed shutter technique and displayed by a pulse-type display. FIG. 13D shows recognition by the observer in the case of an image which is captured by a high-speed shutter technique and displayed by a hold-type display.

The hold type used herein means a display type which maintains the display of each pixel on the screen during each frame period, and a display of the hold type is, for example, an LCD. Display devices using LEDs or display devices using EL (electroluminescence) can be operated as displays of the hold type.

The pulse-type display is, for example, a CRT or an FED.

In addition, displays are classified into not only the hold type (hold type) and the pulse type but also pixel-type displays in which elements are respectively arranged in individual pixels (for example, displays using LCDs or LEDs and displays using EL) and so-called matrix-driven displays which are driven by voltages, currents or the like being individually applied to vertical positions which are arranged on the screen in units of a predetermined length as well as to horizontal positions which are arranged on the screen in units of a predetermined length.

As can be seen from FIGS. 13A to 13D, moving image quality degradations differ under different conditions. For example, the moving objects observed by tracking in FIGS. 13B and 13D are indistinctly visible compared to the recognition of the moving objects observed by tracking in FIG. 13A or 13C. This phenomenon is called "motion blur" which is peculiar to displays operative under hold-type emission conditions. The "motion blur" is a blur occurring in an object which is being gazed at by the observer, and is a degradation easily perceptible to the observer.

Figure 14:
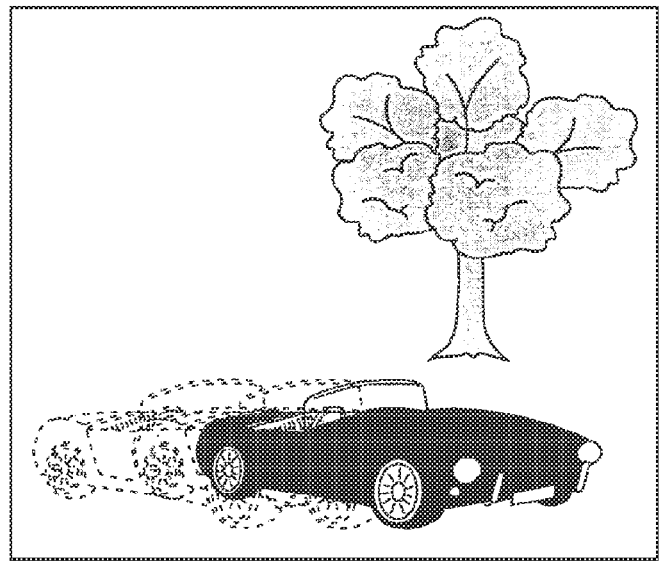
FIG. 14 A view for explaining strobe artifacts.

In addition, there occur degradations such as strobe artifacts (jerkiness) due to fixation in FIG. 3D and strobe artifacts due to tracking in FIGS. 13A and 13C. The strobe artifacts mean that moving image degradation which causes an observer to see multiple copies of a moving object (such as a car) at once or see the moving object as if it were performing a nonsmooth discrete motion, as shown in FIG. 14, when the observer fixates on a fixed object (for example, a tree) on the display. Accordingly, the strobe artifacts which occur in a moving object which is being fixated and a fixed object which is being tracked are in many cases degradations which occur in a section other than an object which is being gazed at, and are not very noticeable compared to the "motion blur". However, when the line of sight is not completely tracking, the relationship between an object to be gazed at and the line of sight becomes the same as that between a moving object during fixation and the line of sight or that between a fixed object during tracking and the line of sight. In this case, strobe artifacts occur in an object which is being gazed at, so that a very noticeable degradation occurs. This phenomenon is noticeable in video sources which are moving so fast that the next motion is not easily predictable, for example, sports relay broadcasting and action movies. During the capture of a moving image for a movie or the like, various techniques are employed to prevent such moving image quality degradation: for example, a moving object is captured by a camera while being tracked by the camera, and the captured moving object is displayed in the state of a fixed object on a display screen, or a blur called motion blur is introduced to suppress strobe artifacts. However, restrictions imposed by these techniques result in limitations on representation means. In addition, these means cannot be used for sports or the like, because the motion of an object of interest is unpredictable.

The above-mentioned moving image quality degradation increases according to the angular velocity of a moving object. Accordingly, if a moving image of the same video scene is displayed on a display having a larger viewing angle, the quality of the moving image degrades more remarkably. In addition, an attempt to increase resolution hardly improves the moving image quality degradation mentioned hereinabove. On the contrary, higher resolution results in a greater improvement in still image quality, so that moving image quality degradation becomes more noticeable. As displays of larger screen size and higher resolution are developed, the above-mentioned moving image quality is expected to become a greater problem in the future.

The cause of the moving image quality degradation is a lack of time reproducibility. Accordingly, a fundamental solution is to improve time reproducibility. More specifically, an useful solution is to increase frame rates for both image capture and display.

The relationship between the moving image quality degradation and the type of display will be described between in more detail.

For example, it can be seen from a comparison between FIGS. 13A and 13B that the length of the moving object image visually recognized by tracking in FIG. 13B is longer than the length of the moving object image visually recognized by tracking in FIG. 13A, so that a motion blur perceived by the observer who is tracking the moving object displayed on the hold type of display becomes large compared to the case of the pulse type of display. On the other hand, from the fact that the fixed object is visually recognized as separate images by tracking in FIG. 13A and the fixed object is visually recognized as images continuing in the spatial direction, by tracking in FIG. 13B, it can be seen that the fixed object displayed on the hold type of display is naturally visible during tracking compared to the case of the pulse type of display.

Similarly, it can be seen from a comparison between FIGS. 13C and 13D that the length of the moving object image visually recognized by tracking in FIG. 13D is longer than the length of the moving object image visually recognized by tracking in FIG. 13C, so that a motion blur perceived by the observer who is tracking the moving object displayed on the hold type of display becomes large compared to the case of the pulse type of display. On the other hand, from the fact that the fixed object is visually recognized as separate images by tracking in FIG. 13C and the fixed object is visually recognized as images continuing in the spatial direction, by tracking in FIG. 13D, it can be seen that the fixed object displayed on the hold type of display is naturally visible during tracking compared to the case of the pulse type of display.

During tracking, the recognition of the moving object and the fixed object shown in FIG. 13A is the same as the recognition of the moving object and the fixed object shown in FIG. 13B, and the recognition of the moving object and the fixed object shown in FIG. 13C is the same as the recognition of the moving object and the fixed object shown in FIG. 13D, but the recognition of the moving object and the fixed object shown in FIGS. 13A and 13B differs from the recognition of the moving object and the fixed object shown in FIGS. 13C and 13D. It can be seen from this fact that the recognition of the moving object and the fixed object during fixation (the manner of occurrence of motion blur and strobe artifacts (jerkiness)) is the same irrespective of whether the type of display is the pulse type or the hold type. In addition, it can be seen that even if a moving object whose image is captured by an open shutter technique is observed by fixation, strobe artifacts (jerkiness) are not perceived, but if a moving object whose image is captured by a high-speed shutter technique is observed by fixation, strobe artifacts (jerkiness) are perceived.

FIG. 15 shows the degree of amelioration of moving image degradation that is achieved when the moving image data mentioned above with reference to FIG. 13 is captured at a twice as high frame rate and is displayed at a twice as high frame rate.

Figure 15A:
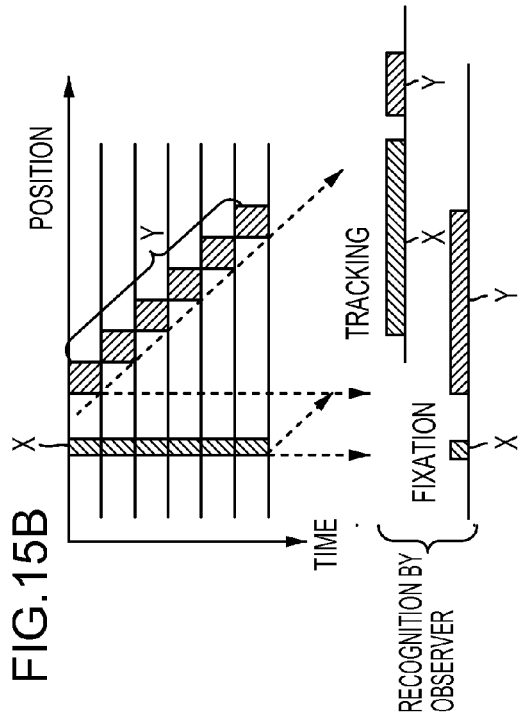
FIG. 15 A view for explaining recognition by the observer at a high frame rate under image capture conditions, under display condition and under observation conditions.
Figure 15B:
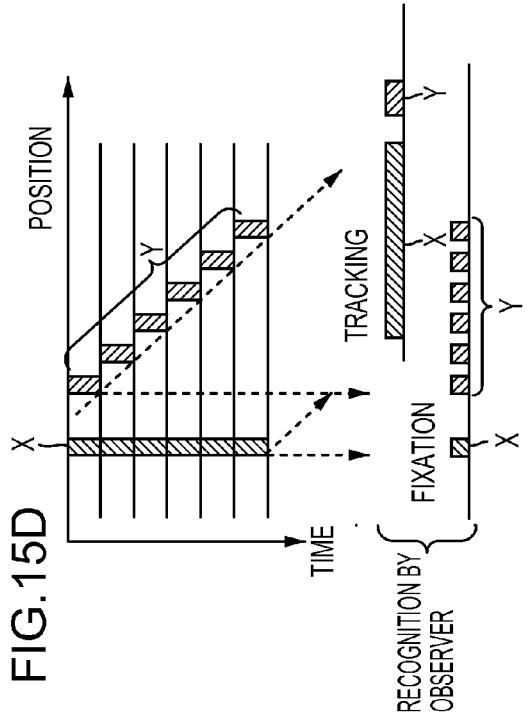
Figure 15C:
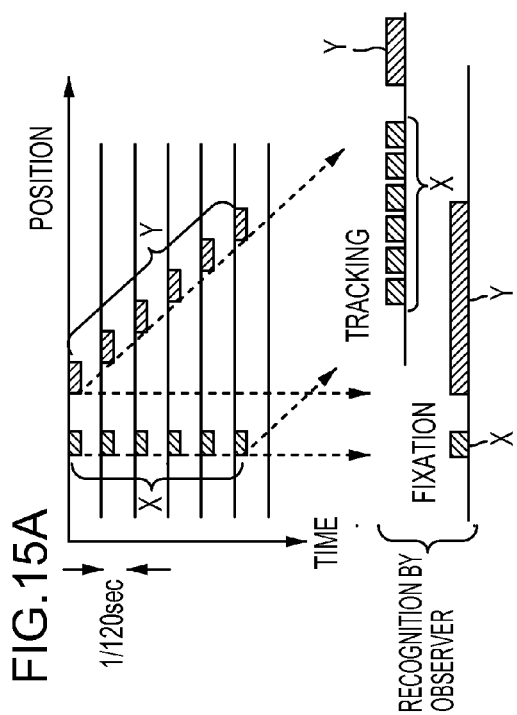
Figure 15D:
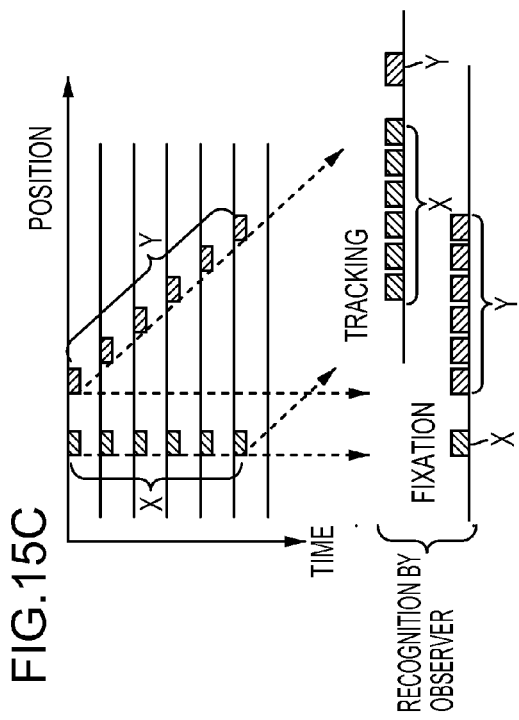

FIG. 15A shows the recognition of a moving image by the observer, which is captured by an open shutter technique and is displayed by a pulse-type display at a frame twice as high as that in the case mentioned above with reference to FIG. 13. FIG. 15B shows the recognition of a moving image by the observer, which is captured by an open shutter technique and is displayed by a hold-type display at a frame twice as high as that in the case mentioned above with reference to FIG. 13. FIG. 15C shows the recognition of a moving image by the observer, which is captured by a high-speed shutter technique and is displayed by a pulse-type display at a frame twice as high as that in the case mentioned above with reference to FIG. 13. FIG. 15D shows the recognition of a moving image by the observer, which is captured by a high-speed shutter technique and is displayed by a hold-type display at a frame twice as high as that in the case mentioned above with reference to FIG. 13.

As shown in each of FIGS. 15A to 15D, the amount of blur due to blur artifacts in the recognition of the display image is reduced to half in each of the capture and display methods. In addition, image degradation due to strobe artifacts is ameliorated because a stroboscopic discrete number becomes twice as large. More specifically, the blur artifacts and the strobe artifacts are linearly improved with respect to an increase in the frame rate. In addition, as the frame rate is increased, the difference between the qualities of moving image quality degradation depending on shutter periods and emission periods is decreased. More specifically, it can be said that increased frame rates are very useful means for improving moving image quality.

From a comparison of FIGS. 13A and 15A and a comparison of FIGS. 13B and 15B, it is clear that the ratio of the length of the moving object visually perceived by tracking in FIG. 15B to the length of the moving object visually perceived by tracking in FIG. 13B is smaller than the ratio of the length of the moving object visually perceived by tracking in FIG. 15A to the length of the moving object visually perceived by tracking in FIG. 13A. Similarly, from a comparison of FIGS. 13C and 15C and a comparison of FIGS. 13D and 15D, it is clear that the ratio of the length of the moving object visually perceived by tracking in FIG. 15D to the length of the moving object visually perceived by tracking in FIG. 13D is smaller than the ratio of the length of the moving object visually perceived by tracking in FIG. 15C to the length of the moving object visually perceived by tracking in FIG. 13C.

More specifically, it can be said that if the frame rates of both the pulse and hold types of displays are similarly increased, the effect of decrease of motion blur in the hold type of display is higher than in the pulse type of display. More specifically, the effect of an increase in frame rate on a decrease in motion blur occurring during tracking is remarkable in the hold type of display.

On the other hand, as to the strobe artifacts (jerkiness), since the interval between separately displayed images of a fixed object generally becomes shorter, the strobe artifacts (jerkiness) generally become less perceptible.

As to the display of moving images captured by an open shutter, evaluation was performed on their moving image quality under tracking conditions in terms of jerkiness and motion blur through visual psychophysical experiment.

Figure 17:
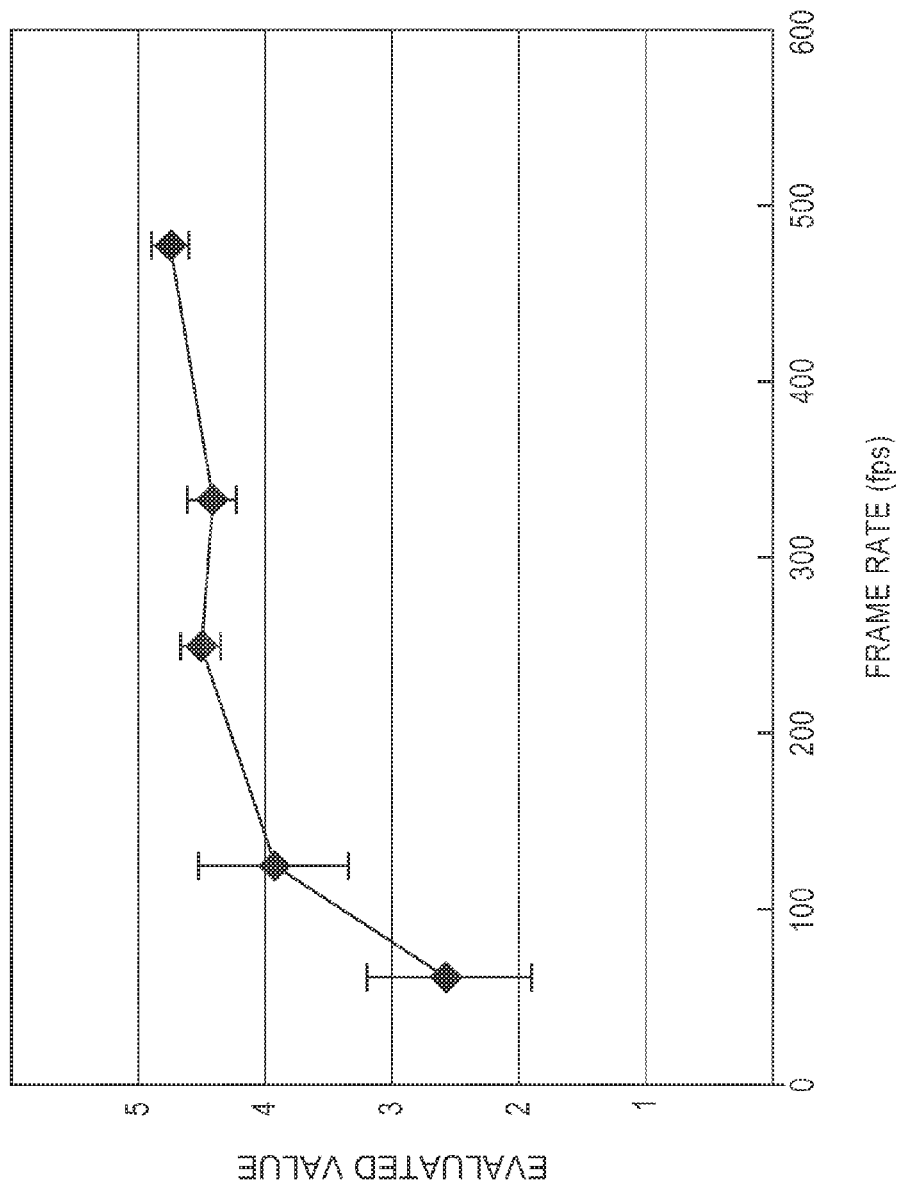
FIG. 17 A view for explaining the result of evaluation of moving image quality in terms of motion blur.

The result of evaluation in terms of jerkiness is shown in FIG. 16, and the result of evaluation in terms of motion blur is shown in FIG. 17. For this evaluation, various kinds of moving images such as natural moving images, CG motion and video images captured by an open shutter were prepared. Evaluation points were given on the following degradation scale: evaluated value 5="degradation is imperceptible", evaluated value 4="degradation is perceptible but not annoying", evaluated value 3="degradation is perceptible but not obstructive", evaluated value 2="degradation is obstructive", and evaluated value 1="degradation is very obstructive". In addition, evaluation points were given on the following evaluation scale: evaluated value 5="very good", evaluated value 4="good", evaluated value 3="fair", evaluated value 2="poor", and evaluated value 1="very poor". In this experiment, evaluation was executed on a sufficient number of test subjects to realize examination as to evaluation of general moving image quality. In FIGS. 16 and 17, the average and the standard deviation of evaluated values given by all test subjects as to all scenes are plotted.

As compared with the jerkiness shown in FIG. 16, the variation in the evaluated value of motion blur shown in FIG. 17 is large, and the tendency that the evaluated value of the moving image quality becomes higher as the frame rate becomes higher is observed in common to both the jerkiness and the motion blur. The evaluated value of the motion blur in particular showed a broken-line-shaped tendency to reach the neighborhood of evaluated value 4.5 which is a perception limit, in the neighborhood of 250 fps, and show flat values not lower than an evaluated value of 4.5 at far higher frame rates. The evaluated value of the jerkiness also showed a broken-line-shaped tendency to reach the neighborhood of evaluated value 4.5 which is a perception limit, in the neighborhood of 250 fps, and show approximately flat values not lower than an evaluated value of 4.5 at far higher frame rates.

Accordingly, the motion blur during tracking which causes a particularly remarkable degradation in moving image quality can be satisfactorily improved by frame rates near 250 fps. More specifically, this fact suggests that the neighborhood of 250 fps is an ideal frequency which allows for the effectiveness of presently widely used video resources. Specifically, a large number of presently widely used video resources have a frame rate of 50 Hz or 60 Hz as mentioned previously, and this fact suggests that 240 Hz or 250 Hz which is an integral multiple of the frequency is an ideal frequency which allows for the effectiveness of the video resources.

This evaluation will be described below in more detail. In the EBU (European Broadcast Union) method, an evaluated value of 4.5 is a perception limit above which no difference is basically imperceptible in any area corresponding to evaluated values higher than 4.5, while an evaluated value of 3.5 is an allowable limit below which an improvement is basically imperceptible in any area corresponding to evaluated values lower than 3.5.

In the result of evaluation focused on motion blur, a frame rate corresponding to the allowable limit of evaluated value 3.5 is 105. At a frame rate of 105, general users begin to perceive amelioration of motion blur. More specifically, at frame rates of 105 or higher, general users can perceive amelioration of motion blur.

In the result of evaluation focused on motion blur, a frame rate corresponding to the perception limit of evaluated value 4.5 is 230. At frame rates of 230 or higher, general users perceive satisfactory amelioration of motion blur. In other words, at frame rates of 230 or higher, general users perceive amelioration of motion blur reaching the peak. More specifically, at frame rates of 230 or higher, general users can satisfactorily perceive amelioration of motion blur.

In the result of evaluation focused on jerkiness, the evaluated value for a frame rate of 480 is 5.0 which is a value whose standard deviation is extremely small. Accordingly, at a frame rate of 480, general users cannot recognize jerkiness. More specifically, at a frame rate of 480, image degradation due to jerkiness scan be suppressed to such an extent that general users cannot recognize.

Accordingly, moving image quality degradation can be ameliorated at a frame rate of 150, 200, 250, 300, 350, 400, 450 or 500 which is a frame rate not lower than 105 and equal to an integral multiple of a frame rate of 50 in PAL. At the frame rate not lower than 150 and equal to an integral multiple of a frame rate of 50 in PAL, general users can perceive amelioration of motion blur. At a frame rate not lower than 250 and equal to an integral multiple of a frame rate of 50 in PAL, general users can satisfactorily perceive amelioration of motion blur.

Similarly, moving image quality degradation can be ameliorated at a frame rate of 120, 180, 240, 300, 360, 420, or 480 which is a frame rate not lower than 105 and equal to an integral multiple of a frame rate of 60 in NTSC. At the frame rate not lower than 120 and equal to an integral multiple of a frame rate of 60 in NTSC, general users can perceive amelioration of motion blur. At a frame rate not lower than 240 and equal to an integral multiple of a frame rate of 60 in NTSC, general users can satisfactorily perceive amelioration of motion blur.

At a frame rate equal to an integral multiple of the frequency of a general broadcasting format, for example, NTSC or PAL, image processing can be easily executed. In addition, it is already general to use a three-panel type prism during the capture of a video image. Accordingly, image processing can be easily performed with a video signal having a frame rate of 180 which is a frame rate not lower than an evaluated value of 3.5 above which general users can perceive amelioration of motor blur in the EBU method, and such video signal can be easily acquired by capturing video images each having a frame rate of 60 while shifting the video images from one another by $1/180$ sec, by means of a three-panel type prism.

In addition, from a series of experiments, it has been discovered that a frame rate of 360 or 350 is particularly preferable when a computer graphics image is to be displayed. This is because computer graphics images generally contain high frequency components, for example, in their edges. Accordingly, image quality degradation due to jerkiness can be easily perceived, and when a frame rate of 250 or 240 is changed to a frame rate of 360 or 350, even general users can perceive an improvement in image quality.

Figure 18:
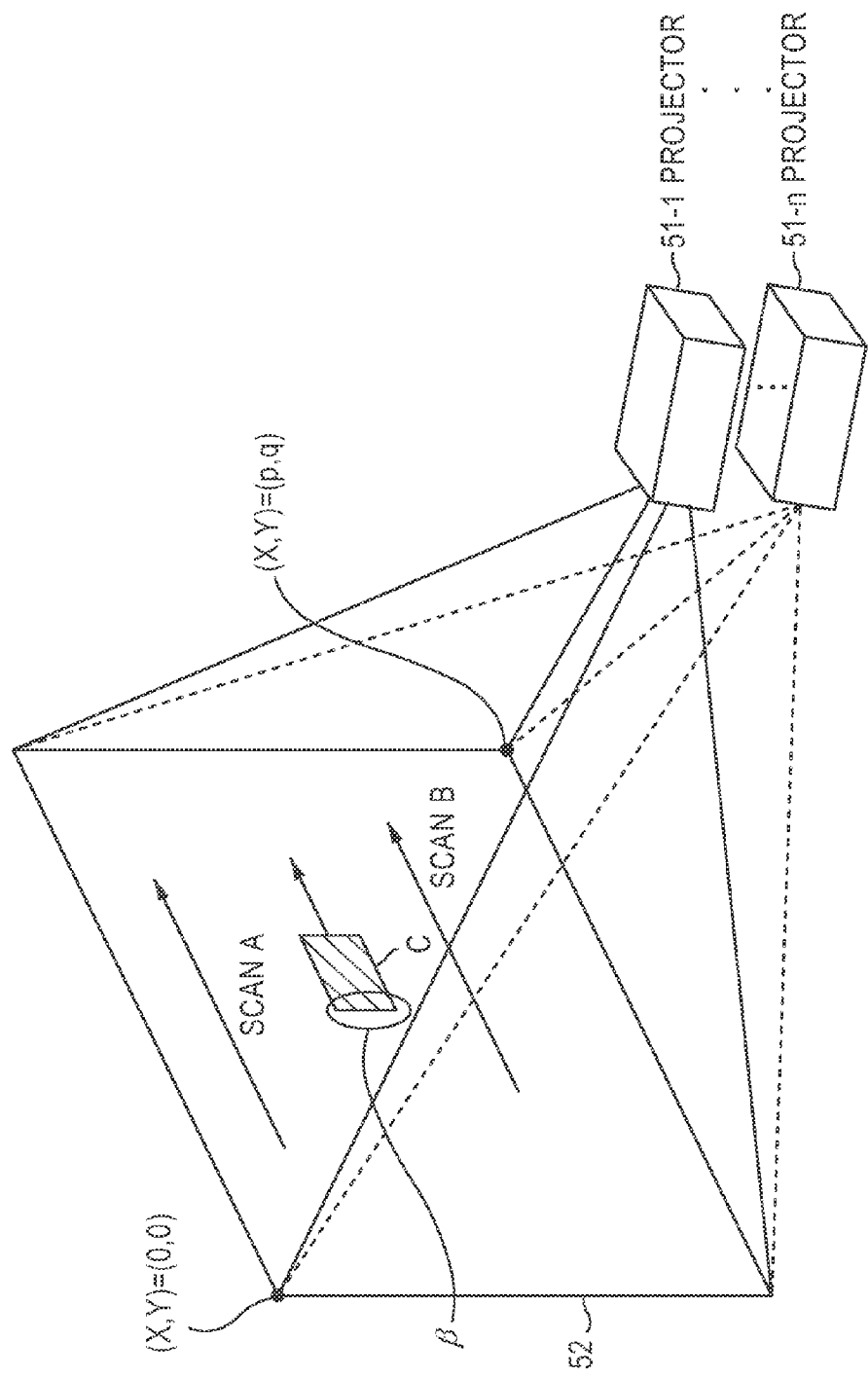
FIG. 18 A view for explaining a construction example of projectors and a screen, where n is a number except 2.

The image display system according to the present invention, mentioned above with reference to FIG. 1 or FIG. 6, can be employed to display a moving image at 240 Hz or 250 HZ which is a frequency equal to an integral multiple of 50 Hz or 60 Hz. For example, as shown in FIG. 18, two or more projectors 51-1 to 51-$n$ and the image display system according to the present invention can be employed to realize display of a moving image at 240 Hz or 250 Hz which is a frequency equal to an integral multiple of 50 Hz or 60 Hz.

Each of the projectors 51-1 to 51-$n$ displays a frame image corresponding to a supplied video signal by scanning a pixel (X, Y)=(0, 0) to a pixel (X, Y)=(p, q), which form a display image to be displayed, on the screen 52 in the horizontal direction at a timing based on the control of the display control section 27. When the frame rate of a moving image supplied to the image display system is m Hz, the frame rage of α frame image displayed on the screen 52 by each of the projectors 51-1 to 51-$n$ is m/n Hz, but the frame rate of a moving image displayed by the projectors 51-1 to 51-$n$ is m Hz. The scan start timing of each frame displayed by each of the projectors 51-1 to 51-*n* is shifted by a 1/n phase, i.e., 1/m sec, from one frame of display provided by each of the projectors 51-1 to 51-*n*.

For example, while a projector 91-2 is scanning a line corresponding to the α+1 frame on a line denoted by SCAN B on a screen 92, a projector 91-3 is scanning a line corresponding to the α+2 frame on a line denoted by SCAN A on the screen 92. The line denoted by SCAN B is a line shifted from the line denoted by SCAN A by 1/n of the number of lines of one frame. More specifically, a moving image displayed on the screen 92 is alternately rewritten by a plurality of scans including the scan A and the scan B at a time interval of 1/m.

Figure 19:
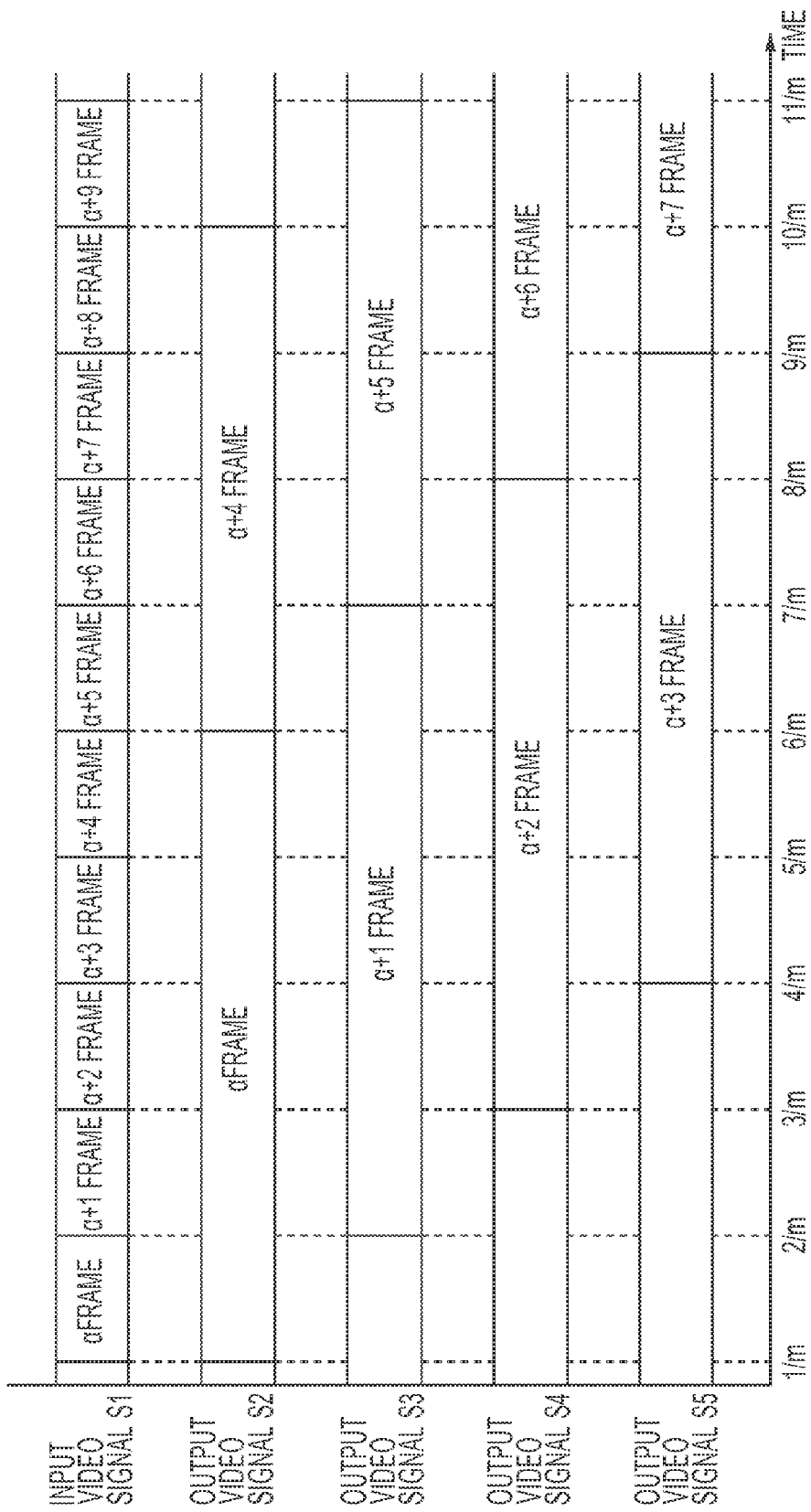
FIG. 19 A view for explaining the timing of an input video signal and output video signals, where m=240 and n=4.

If the frame rate of an input image signal is 240 Hz and the separation number of image signals is, for example, four, image signals outputted from the frame memories are sequentially supplied to four D/A conversion sections or frames separated into four by the data separation section are sequentially supplied to and stored in four frame memories, respectively. Thus, as shown in FIG. 19, the input video signal S1 is separated into four output video signals S2, S3, S4 and S5, and the four output video signals S2, S3, S4 and S5 are respectively supplied to four scan control sections.

The first scan control section controls the display of the α frame, the α+4 frame, . . . , all of which correspond to the output video signal S2. The second scan control section controls the display of the α+1 frame, the α+5 frame, all of which correspond to the output video signal S3. The third scan control section controls the display of the α+2 frame, the α+6 frame, . . . , all of which correspond to the output video signal S4. The fourth scan control section controls the display of the α+3 frame, the α+7 frame, . . . , all of which correspond to the output video signal S5. The frame rate of frames of the output video signals respectively displayed by the first to fourth scan control sections is ¼ of the frame rate of the input video signal, and the scan start times of frames respectively scanned by the first to fourth scan control sections are shifted from one another by ¼ of the period of scan required for display of one frame of each of the output video signals S2 to S5.

Figure 20:
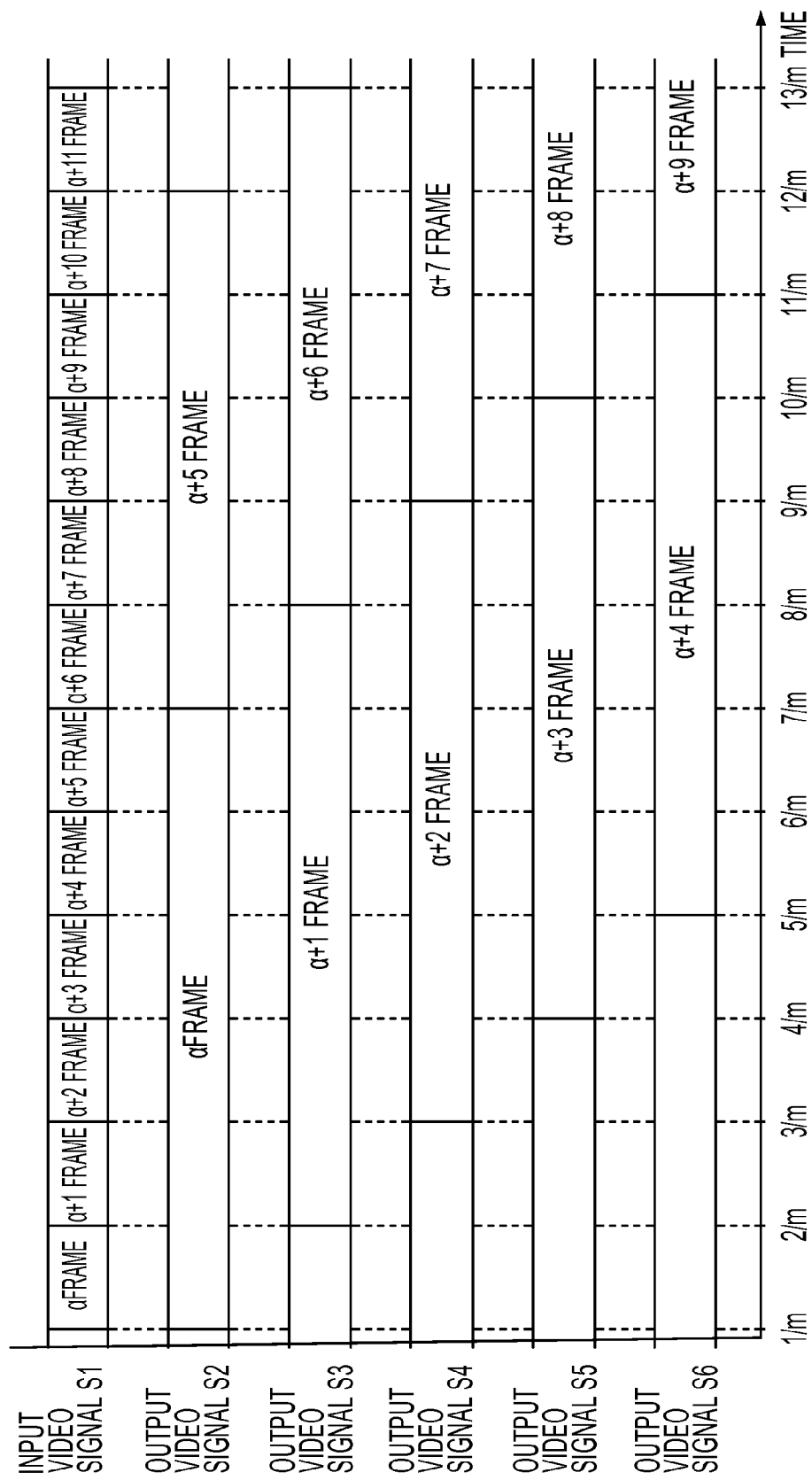
FIG. 20 A view for explaining the timing of an input video signal and output video signals, where m=250 and n=5.

If the frame rate of an input image signal is 240 Hz and the separation number of image signals is, for example, five, image signals outputted from the frame memories are sequentially supplied to five D/A conversion sections or frames separated into five by the data separation section are sequentially supplied to and stored in five frame memories, respectively. Thus, as shown in FIG. 20, the input video signal S1 is separated into five output video signals S2, S3, S4, S5 and S6, and the five output video signals S2, S3, S4, S5 and S6 are respectively supplied to five scan control sections.

The first scan control section controls the display of the α frame, the α+5 frame, . . . , all of which correspond to the output video signal S2. The second scan control section controls the display of the α+1 frame, the α+6 frame, . . . , all of which correspond to the output video signal S3. The third scan control section controls the display of the α+2 frame, the α+7 frame, . . . , all of which correspond to the output video signal S4. The fourth scan control section controls the display of the α+3 frame, the α+8 frame, . . . , all of which correspond to the output video signal S5. The fifth scan control section controls the display of the α+4 frame, the α+9 frame, . . . , all of which correspond to the output video signal S6. The frame rate of frames of the output video signals respectively displayed by the first to fifth scan control sections is ⅕ of the frame rate of the input video signal, and the scan start times of frames respectively scanned by the first to fourth scan control sections are shifted from one another by ⅕ of the period of scan required for display of one frame of each of the output video signals S2 to S6.

In the display of moving images at the presently most widely used frame rate of 50 Hz or 60 Hz, moving image quality degradation such as blur or jerkiness is remarkable. On the other hand, when, for example, 4 or 5 is used as the separation number n of a video signal according to the present invention, a moving image having a high frame rate can be displayed by using a widely used conventional type of display device (such as a projector) which operates at a frame rate of 50 Hz or 60 Hz. For example, when the separation number of an input video signal is n=4 and the frame rate of a display image outputted from each of the projectors 51-1 to 51-4 is 60 Hz, the frame rate of a moving image displayed on the screen 52 becomes substantially 240 Hz. Furthermore, for example, when the separation number of an input video signal is n=5 and the frame rate of a display image outputted from each of the projectors 51-1 to 51-4 is 50 Hz, the frame rate of a moving image displayed on the screen 52 becomes substantially 250 Hz.

A large number of presently widely used video resources have α frame rate of 50 Hz or 60 Hz as mentioned previously, so that 240 Hz or 250 Hz which is an integral multiple of the frequency becomes an ideal frequency which allows for the effectiveness of the video resources.

In this case as well, it goes without saying that the number of scan control sections may be set to s and the separation number of the input video signal may be set to n smaller than s so that a moving image can be displayed by using n number of scan control sections from among the s number of scan control sections.

Figure 21:
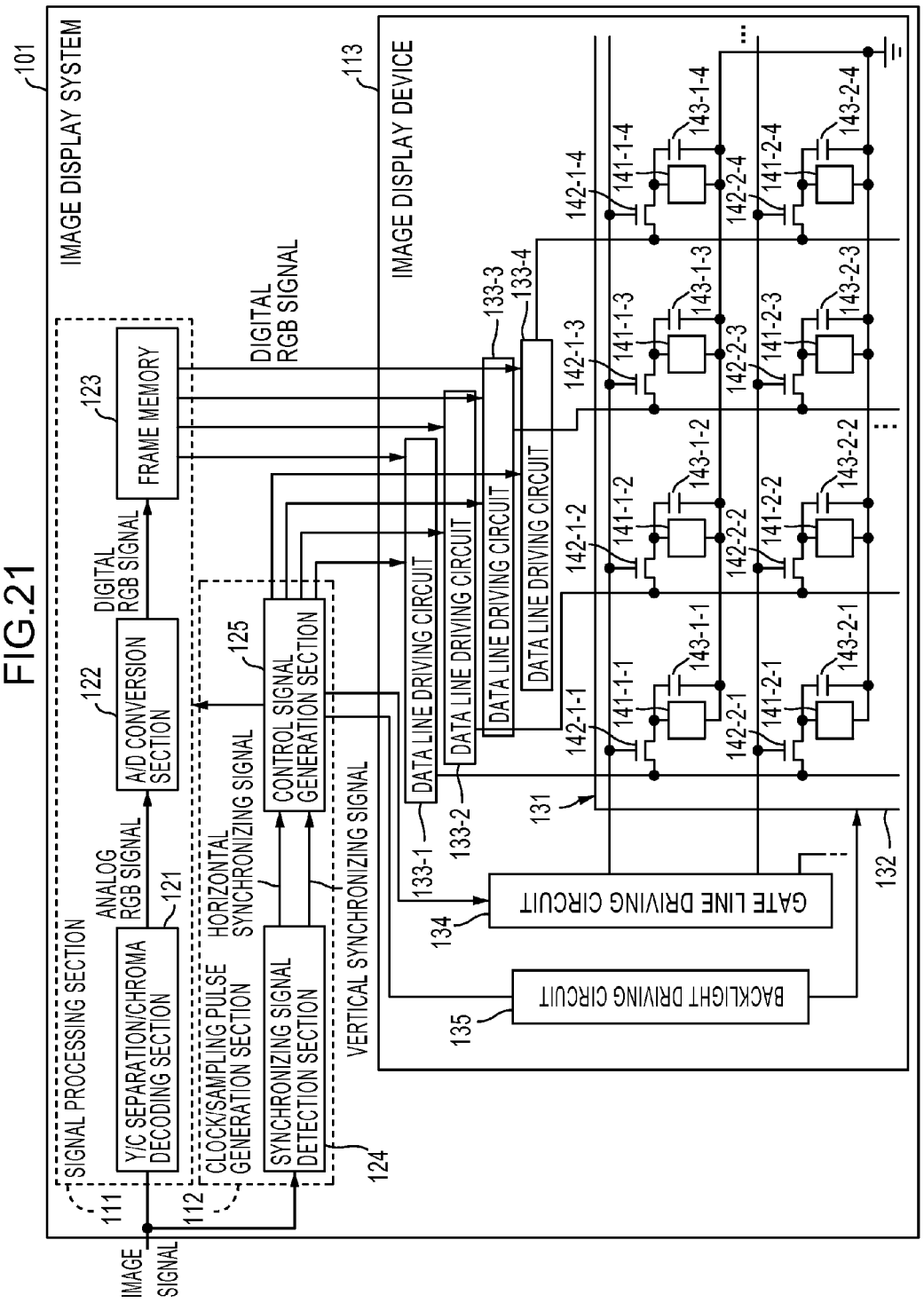
FIG. 21 A view for explaining the construction of an image display system 101 using an LCD.

An image display system 101 having another construction according to the embodiment of the present invention will be described below. FIG. 21 is a block diagram showing the construction of the image display system 101 using an LCD.

The image display system 101 shown in FIG. 21 includes an signal processing section 111, a clock/sampling pulse generation section 112, and an image display device 113. The signal processing section 111 acquires an image signal which is an input signal, and applies signal processing to the acquired image signal and supplies a digital RGB (Red, Green, Blue) signal to the image display device 113. The clock/sampling pulse generation section 112 acquires the image signal which is an input signal, and detects a horizontal synchronizing signal and a vertical synchronizing signal from the acquired image signal and generates control signals on the basis of the detected horizontal and vertical synchronizing signals. The clock/sampling pulse generation section 112 supplies the generated control signals to the signal processing section 111 and the image display device 113.

The image display device 113 is provided with an LCD, and displays an image on the basis of the signals supplied from the signal processing section 111 and the clock/sampling pulse generation section 112.

The signal processing section 111 is made of a Y/C separation/chroma decoding section 121, an A/D conversion section 122 and a frame memory 123. The Y/C separation/chroma decoding section 121 separates the acquired image signal into a luminance signal (Y) and a color signal (C), and decodes the color signal and generates an analog RGB signal. The Y/C separation/chroma decoding section 121 supplies the generated analog RGB signal to the A/D conversion section 122.

The A/D conversion section 122 performs analog/digital conversion of the analog RGB signal supplied from the Y/C separation/chroma decoding section 121, on the basis of the control signal supplied from the clock/sampling pulse generation section 112, and supplies the generated digital RGB signal to the frame memory 123. The frame memory 123 temporarily stores the digital RGB signal sequentially supplied from the A/D conversion section 122, and supplies the stored digital RGB signal to the image display device 113.

The clock/sampling pulse generation section 112 includes a synchronizing signal detection section 124 and a control signal generation section 125. The synchronizing signal detection section 124 detects a horizontal synchronizing signal and a vertical synchronizing signal from the acquired image signal, and supplies the detected horizontal and vertical synchronizing signals to the control signal generation section 125. The control signal generation section 125 generates a control signal for controlling analog/digital conversion in the A/D conversion section 122 and a control signal for controlling display on the image display device 113, on the basis of the horizontal and vertical synchronizing signals supplied from the synchronizing signal detection section 124, and supplies the generated control signals to the A/D conversion section 122 and the image display device 113.

The image display device 113 includes an LCD 131, a backlight 132, data line driving circuits 133-1 to 133-4, a gate line driving section 134, and a backlight driving circuit 135. The LCD 131 is a hold type of display having matrix-driven pixels, and displays an image by varying the amount of transmitted light by controlling the orientation of liquid crystal inside pixels which are respectively formed by liquid crystal cells arranged in the screen.

The backlight 132 is a light source which emits light to enter the LCD 131 from the back thereof. On the basis of the control signal supplied from the control signal generation section 125, the data line driving circuits 133-1 to 133-4 and the gate line driving section 134 performs matrix driving of each pixel of the LCD 131 according to the digital RGB signal supplied from the signal processing section 111. The backlight driving circuit 135 drives the backlight 132 to emit light.

More specifically, in the LCD 131, a set of a liquid crystal cell 141-1-1, a TFT (Thin Film Transistor) 142-1-1 and a capacitor 143-1-1 to a set of a liquid crystal cell 141-*n-m* (not shown), a TFT 142-*n-m* (not shown) and a capacitor 143-*n-m* (not shown) are respectively arranged in the first column of the first row through the n-th column of the n-th row.

The liquid crystal cell 141-1-1 to the liquid crystal cell 141-*n-m* will be hereinafter referred to simply as the liquid crystal cell 141 unless the liquid crystal cells 141-1-1 to 141-*n-m* need be individually identified. The TFT 142-1-1 to the TFT 142-*n-m* will be hereinafter referred to simply as the TFT 142 unless the TFTs 142-1-1 to 142-*n-m* need be individually identified. The capacitors 143-1-1 to the TFT 143-*n-m* will be herein after referred to simply as the capacitor 143 unless the capacitors 143-1-1 to 143-*n-m* needed to be individually identified.

One liquid crystal cell 141, one TFT 142 and one capacitor 143 are arranged as one set so as to construct a subpixel. The liquid crystal cell 141 contains liquid crystal, and varies the amount of transmitted light of light irradiated from the backlight 132, in accordance with voltage applied by the TFT 142. The TFT 142 drives the liquid crystal cell 141 by applying the voltage to the liquid crystal cell 141. The capacitor 143 is provided in parallel with the liquid crystal cell 141, and holds the voltage applied to the liquid crystal cell 141, during the period of each frame.

In the LCD 131, the liquid crystal cell 141-1-1, the TFT 142-1-1 and the capacitor 143-1-1 all of which constitute one subpixel are arranged in the first left column of the first top row. In the LCD 131, the liquid crystal cell 141-1-2, the TFT 142-1-2 and the capacitor 143-1-2 all of which constitute one subpixel are arranged on the right side of the liquid crystal cell 141-1-1, the TFT 142-1-1 and the capacitor 143-1-1. Furthermore, in the LCD 131, the liquid crystal cell 141-1-3, the TFT 142-1-3 and the capacitor 143-1-3 all of which constitute one subpixel as well as the liquid crystal cell 141-1-4, the TFT 142-1-4 and the capacitor 143-1-4 all of which constitute one subpixel are arranged on the right side in named order.

In the LCD 131, four subpixels which are arranged side by side in a horizontal line constitute one pixel (pixel). More specifically, the liquid crystal cell 141-1-1 to the capacitor 143-1-4 constitute one pixel.

Similarly, in the LCD 131, the liquid crystal cell 141-2-1, the TFT 142-2-1 and the capacitor 143-2-1 all of which constitute one subpixel are arranged in the first left column of the second top row. In the LCD 131, the liquid crystal cell 141-2-2, the TFT 142-2-2 and the capacitor 143-2-2 all of which constitute one subpixel are arranged on the right side of the liquid crystal cell 141-2-1, the TFT 142-2-1 and the capacitor 143-2-1. Furthermore, in the LCD 131, the liquid crystal cell 141-2-3, the TFT 142-2-3 and the capacitor 143-2-3 all of which constitute one subpixel as well as the liquid crystal cell 141-2-4, the TFT 142-2-4 and the capacitor 143-2-4 all of which constitute one subpixel are arranged on the right side in named order.

The liquid crystal cell 141-2-1 to the capacitor 143-2-4 constitute one pixel.

For example, if an image signal of 240 frames/sec is supplied, the control signal generation section 125 supplies a control signal to the data line driving circuit 133-1 so that a frame 1 which is the first frame is displayed on a subpixel located on the most left side of one pixel.

The data line driving circuit 133-1 reads a digital RGB signal of the frame 1 from the frame memory 123, and supplies a drive signal to the LCD 131 on the basis of the read digital RGB signal of the frame 1 so that the frame 1 is displayed on a subpixel located on the most left side among four subpixels arranged side by side in a horizontal line of one pixel (pixel), for example, the subpixel formed by the liquid crystal cell 141-1-1, the TFT 142-1-1 and the capacitor 143-1-1, or the subpixel formed by the liquid crystal cell 141-2-1, the TFT 142-2-1 and the capacitor 143-2-1.

Then, the control signal generation section 125 supplies a control signal to the data line driving circuit 133-2 so that a frame 2 which is the second frame of the moving image of 240 frames/sec is displayed on a subpixel located on the second left side of the one pixel.

The data line driving circuit 133-2 reads a digital RGB signal of the frame 2 from the frame memory 123, and supplies a drive signal to the LCD 131 on the basis of the read digital RGB signal of the frame 2 so that the frame 2 is displayed on a subpixel located on the second left side among the four subpixels arranged side by side in a horizontal line of the one pixel (pixel), for example, the subpixel formed by the liquid crystal cell 141-1-2, the TFT 142-1-2 and the capacitor 143-1-2, or the subpixel formed by the liquid crystal cell 141-2-2, the TFT 142-2-2 and the capacitor 143-2-2.

Furthermore, the control signal generation section 125 supplies a control signal to the data line driving circuit 133-3 so that a frame 3 which is the third frame of the moving image of 240 frames/sec is displayed on a subpixel located on the third left side of the one pixel.

The data line driving circuit 133-3 reads a digital RGB signal of the frame 3 from the frame memory 123, and supplies a drive signal to the LCD 131 on the basis of the read digital RGB signal of the frame 3 so that the frame 3 is displayed on a subpixel located on the third left side among the four subpixels arranged side by side in a horizontal line of the one pixel (pixel), for example, the subpixel formed by the liquid crystal cell 141-1-3, the TFT 142-1-3 and the capacitor 143-1-3, or the subpixel formed by the liquid crystal cell 141-2-3, the TFT 142-2-3 and the capacitor 143-2-3.

Still furthermore, the control signal generation section 125 supplies a control signal to the data line driving circuit 133-4 so that a frame 4 which is the fourth frame of the moving image of 240 frames/sec is displayed on a subpixel located on the most right side of the one pixel.

The data line driving circuit 133-4 reads a digital RGB signal of the frame 4 from the frame memory 123, and supplies a drive signal to the LCD 131 on the basis of the read digital RGB signal of the frame 4 so that the frame 4 is displayed on a subpixel located on the most right side among the four subpixels arranged side by side in a horizontal line of the one pixel (pixel), for example, the subpixel formed by the liquid crystal cell 141-1-4, the TFT 142-1-4 and the capacitor 143-1-4, or the subpixel formed by the liquid crystal cell 141-2-4, the TFT 142-2-4 and the capacitor 143-2-4.

Then, the control signal generation section 125 supplies a control signal to the data line driving circuit 133-1 so that a frame 5 which is the fifth frame of the moving image of 240 frames/sec is displayed on a subpixel located on the most left side of one pixel.

The data line driving circuit 133-1 reads a digital RGB signal of the frame 5 from the frame memory 123, and supplies a drive signal to the LCD 131 on the basis of the read digital RGB signal of the frame 5 so that the frame 5 is displayed on a subpixel located on the most left side among four subpixels arranged side by side in a horizontal line of the one pixel (pixel), for example, the subpixel formed by the liquid crystal cell 141-1-1, the TFT 142-1-1 and the capacitor 143-1-1, or the subpixel formed by the liquid crystal cell 141-2-1, the TFT 142-2-1 and the capacitor 143-2-1.

In this manner, four subpixels arranged side by side in a horizontal line of one pixel (pixel) sequentially displays an image of one frame.

In this case, it is preferable that each frame be displayed during a period of 1/240 sec, but it is also preferable that each frame be displayed during a longer period of, for example, 1/60 sec.

According to this construction, even if the response time of liquid crystal is long, it is possible to display a moving image made of a larger number frames per sec. For, example, it is possible to display a moving image of 240 frames/sec.

Although an LCD is used in the above-mentioned construction, any type of matrix-driven display may be used instead of an LCD. For example, displays using LEDs or organic EL displays may be used.

As described hereinabove, in a hold type of display which maintains the display of each pixel on the screen during each frame period, display is controlled to display a moving image made of 105 or more frames/sec, and when a moving image made of 105 or more frames/sec is displayed on the basis of such control, a moving image of less degradation can be presented to an observer who is a person viewing the displayed moving image, on the basis of human visual characteristics without unnecessarily increasing the frame rate.

In addition, in a matrix-driven type of display, display is controlled to display a moving image made of 105 or more frames/sec, and when a moving image made of 105 or more frames/sec is displayed on the basis of such control, a moving image of less degradation can be presented to an observer who is a person viewing the displayed moving image, on the basis of human visual characteristics without unnecessarily increasing the frame rate.

All the processes mentioned above may also be executed by means of software. The software may be installed from a recording medium onto a computer having dedicated hardware in which a program constituting the software is incorporated, or a general-purpose computer capable of executing various functions by various programs being installed thereonto.

The recording medium is formed by a package medium or the like in which a program is recorded so as to be distributed to users separately from computers, and includes, as shown in FIG. 1 or 6, a magnetic disk 31 (such as a flexible disk), an optical disk 32 (such as a CD-ROM (Compact Disk-Read Only Memory) and a DVD (Digital Versatile Disk)), a magneto-optical disk 33 (such as an MD (Mini-Disk (trademark)), a semiconductor memory 34, and the like.

In the present specification, as a matter of course, the steps which describe the program recorded on the recording medium may include not only processes to be performed in a time-serial manner in the order described, but also processes which are not necessarily executed but are executed in parallel or individually.

In the present specification, the term "system" represents an entire apparatus made of a plurality of devices.

The invention claimed is:

1. An image processing apparatus comprising:
a controller configured to control n data-line driver circuits included in a display apparatus, the display apparatus including a plurality of pixels;
wherein each pixel comprises n subpixels and the data-line driver circuits drive the subpixels;
wherein n is an integer greater than 1; and
wherein the controller causes the display apparatus to display a moving picture image such that:
frame information of the moving picture image with a first frame rate is displayed at a second frame rate, which is 1/n of the first frame rate,
each frame of the moving picture image is displayed at the second frame rate in a dot-sequential or line sequential manner by sequentially driving corresponding subpixels, the corresponding subpixels comprising one subpixel from each of the pixels and being disposed in a same respective position within the pixels,
a display start timing is shifted from one frame of the moving picture image to another by a period of time equal to 1/n of a display period of one frame at the second frame rate, and
the subpixel of a given pixel that is driven when a frame of the moving picture image is displayed changes sequentially as each successive frame is displayed such that the n subpixels of each pixel are sequentially driven with a time shift, the time shift being 1/n of a display period of a single frame with the second frame rate.

2. The image processing apparatus according to claim 1, wherein:
each of the pixels includes a plurality of the subpixels that are adjacently disposed and arrayed in a horizontal direction;
each of the n number of data-line driver circuits drives corresponding ones of the subpixels, which are disposed in the same position within the respective pixels.

3. The image processing apparatus according to claim 1, wherein:
the first frame rate is 240 frames per second; and
the second frame rate is 60 frames per second assuming the value of n is four.

4. The image processing apparatus according to claim 1, wherein:
the first frame rate is 200 frames per second; and
the second frame rate is 50 frames per second assuming the value of n is four.

5. The image processing apparatus according to claim 1, wherein:
the first frame rate is 120 frames per second; and
the second frame rate is 60 frames per second assuming the value of n is two.

6. The image processing apparatus according to claim 1, wherein:
the first frame rate is 100 frames per second; and
the second frame rate is 50 frames per second assuming the value of n is two.

7. A method for driving pixels, comprising:
controlling n number of data-line driver circuits included in a display apparatus, the display apparatus including a plurality of pixels;
wherein each pixel comprises n subpixels and the data-line driver circuits drive the subpixels,
wherein n is an integer greater than 1; and
wherein said controlling n number of data-line driver circuits causes the display apparatus to display a moving picture image such that:
frame information of the moving picture image with a first frame rate is displayed at a second frame rate, which is 1/n of the first frame rate,
each frame of the moving picture image is displayed at the second frame rate in a dot-sequential or line sequential manner by sequentially driving corresponding subpixels, the corresponding subpixels comprising one subpixel from each of the pixels and being disposed in a same respective position within the pixels,
a display start timing is shifted from one frame of the moving picture image to another by a period of time equal to 1/n of a display period of one frame at the second frame rate, and
the subpixel of a given pixel that is driven when a frame of the moving picture image is displayed changes sequentially as each successive frame is displayed such that the n subpixels of each pixel are sequentially driven with a time shift, the time shift being 1/n of a display period of a single frame with the second frame rate.

8. The display apparatus according to claim 7, wherein:
each of the pixels includes a plurality of subpixels that are adjacently disposed and arrayed in a horizontal direction;
each of the n number of data-line driver circuits drives corresponding ones of the subpixels, which are disposed in the same position within the respective pixels.

9. The display apparatus according to claim 7, wherein:
the first frame rate is 240 frames per second; and
the second frame rate is 60 frames per second assuming the value of n is four.

10. The image processing apparatus according to claim 7, wherein:
the first frame rate is 200 frames per second; and
the second frame rate is 50 frames per second assuming the value of n is four.

11. The image processing apparatus according to claim 7, wherein:
the first frame rate is 120 frames per second; and
the second frame rate is 60 frames per second assuming the value of n is two.

12. The image processing apparatus according to claim 7, wherein:
the first frame rate is 100 frames per second; and
the second frame rate is 50 frames per second assuming the value of n is two.

13. A computer program product for driving pixels, the computer program product comprising a non-transitory computer readable medium having stored thereon program instructions that, when executed by a processor, perform operations comprising:
controlling n number of data-line driver circuits included in a display apparatus, the display apparatus including a plurality of pixels;
wherein each pixel comprises n subpixels and the data-line driver circuits drive the subpixels,
wherein n is an integer greater than 1; and
wherein said controlling n number of data-line driver circuits causes the display apparatus to display a moving picture image such that
frame information of the moving picture image with a first frame rate is displayed at a second frame rate, which is 1/n of the first frame rate,
each frame of the moving picture image is displayed at the second frame rate in a dot-sequential or line sequential manner by sequentially driving corresponding subpixels, the corresponding subpixels comprising one subpixel from each of the pixels and being disposed in a same respective position within the pixels,
a display start timing is shifted from one frame of the moving picture image to another by a period of time equal to 1/n of a display period of one frame at the second frame rate, and
the subpixel of a given pixel that is driven when a frame of the moving picture image is displayed changes sequentially as each successive frame is displayed such that the n subpixels of each pixel are sequentially driven with a time shift, the time shift being 1/n of a display period of a single frame with the second frame rate.

14. A display apparatus comprising:
display means for displaying a motion picture image, including n data-line driver circuits and a plurality of pixels, wherein each pixel comprises n subpixels and the data-line driver circuits are configured to drive the subpixels; and
a controller configured to control the data-line driver circuits;
wherein n is an integer greater than 1; and
wherein the controller causes the display of a moving picture image such that
frame information of the moving picture image with a first frame rate is displayed at a second frame rate, which is 1/n of the first frame rate,
each frame of the moving picture image is displayed at the second frame rate in a dot-sequential or line sequential manner by sequentially driving corresponding subpixels, the corresponding subpixels comprising one subpixel from each of the pixels and being disposed in a same respective position within the pixels,
a display start timing is shifted from one frame of the moving picture image to another by a period of time equal to 1/n of a display period of one frame at the second frame rate, and
the subpixel of a given pixel that is driven when a frame of the moving picture image is displayed changes sequentially as each successive frame is displayed such that the n subpixels of each pixel are sequentially driven with a time shift, the time shift being 1/n of a display period of a single frame with the second frame rate.

* * * * *